United States Patent
Hasholzner et al.

(10) Patent No.: US 11,012,945 B2
(45) Date of Patent: May 18, 2021

(54) DEVICES AND METHODS FOR POWER ALLOCATION

(71) Applicant: Apple Inc., Cupertino, CA (US)

(72) Inventors: Ralph Hasholzner, Munich (DE); Eugene Gorbatov, Hillsboro, OR (US); Piotr Janik, Fuerth (DE); Ajay Gupta, Portland, OR (US); Ashish Singh, Munich (DE); Kenan Kocagoez, Nuremberg (DE); Johannes Brendel, Erlangen (DE)

(73) Assignee: Apple Inc., Cupertino, CA (US)

( * ) Notice: Subject to any disclaimer, the term of this patent is extended or adjusted under 35 U.S.C. 154(b) by 235 days.

(21) Appl. No.: 15/719,685

(22) Filed: Sep. 29, 2017

(65) Prior Publication Data
US 2019/0104480 A1    Apr. 4, 2019

(51) Int. Cl.
*H04W 52/22*    (2009.01)
*H04W 52/06*    (2009.01)
*H04W 52/34*    (2009.01)

(52) U.S. Cl.
CPC ......... *H04W 52/228* (2013.01); *H04W 52/06* (2013.01); *H04W 52/223* (2013.01); *H04W 52/34* (2013.01); *H04W 52/221* (2013.01); *H04W 52/343* (2013.01); *H04W 52/346* (2013.01)

(58) Field of Classification Search
CPC ......... H04W 52/04–60; H04W 52/228; H04W 52/06; H04W 52/223; H04W 52/34; H04W 52/221; H04W 52/343; H04W 52/346
See application file for complete search history.

(56) References Cited

U.S. PATENT DOCUMENTS

| 5,666,355 A | * | 9/1997 | Huah | H04M 19/02 370/311 |
| 5,832,387 A | * | 11/1998 | Bae | H04L 27/2608 455/522 |
| 6,400,773 B1 | * | 6/2002 | Krongold | H04L 27/2608 370/484 |

(Continued)

FOREIGN PATENT DOCUMENTS

| JP | 2008113528 A | 5/2008 |
| KR | 1020110041204 A | 4/2011 |
| KR | 1020120059709 A | 6/2012 |

OTHER PUBLICATIONS

International Search Report received for PCT Application No. PCT/US2018/048210, dated Jan. 15, 2019, 19 Pages (for reference purpose only).

*Primary Examiner* — Jinsong Hu
*Assistant Examiner* — Rui M Hu
(74) *Attorney, Agent, or Firm* — Kowert, Hood, Munyon, Rankin & Goetzel, P.C.

(57) ABSTRACT

Methods and devices for allocating power among a plurality of circuits in a communication device, including determining a power budget for allocating to the plurality of circuits from a power supply information; receiving an activity status from a first circuit of the plurality of circuits; determining a first power value based on the activity status; deriving a second power value based on the first power value and the power budget; and allocating power to one or more remaining circuits of the plurality of circuits based on the second power value.

20 Claims, 24 Drawing Sheets

(56) References Cited

U.S. PATENT DOCUMENTS

| | | | | | |
|---|---|---|---|---|---|
| 6,477,388 | B1* | 11/2002 | Schmutz | | H04L 5/06 |
| | | | | | 455/522 |
| 6,574,740 | B1* | 6/2003 | Odaohhara | | G06F 1/3265 |
| | | | | | 713/323 |
| 6,819,934 | B1* | 11/2004 | Truong | | H04W 24/00 |
| | | | | | 370/337 |
| 7,017,062 | B2* | 3/2006 | Poisner | | G06F 1/206 |
| | | | | | 713/320 |
| 8,145,251 | B2* | 3/2012 | Love | | H04W 52/367 |
| | | | | | 455/522 |
| 8,989,954 | B1* | 3/2015 | Addepalli | | H04W 4/00 |
| | | | | | 701/32.3 |
| 9,872,299 | B1* | 1/2018 | Mahazri | | H04W 52/367 |
| 9,965,725 | B1* | 5/2018 | Levchuk | | G06F 1/3206 |
| 10,147,464 | B1* | 12/2018 | Wen | | G06F 1/26 |
| 10,216,240 | B2* | 2/2019 | Venishetti | | G06F 1/3287 |
| 10,327,211 | B2* | 6/2019 | Lee | | H04B 1/00 |
| 2004/0155634 | A1* | 8/2004 | Sasaki | | H04M 19/08 |
| | | | | | 323/263 |
| 2004/0203477 | A1* | 10/2004 | Carballo | | H04W 52/04 |
| | | | | | 455/69 |
| 2007/0259659 | A1* | 11/2007 | Bennett | | H04W 52/283 |
| | | | | | 455/422.1 |
| 2007/0260897 | A1* | 11/2007 | Cochran | | G06F 1/3203 |
| | | | | | 713/300 |
| 2008/0151801 | A1* | 6/2008 | Mizuta | | H04W 52/367 |
| | | | | | 370/311 |
| 2008/0168287 | A1* | 7/2008 | Berry | | G06F 1/3296 |
| | | | | | 713/323 |
| 2009/0003294 | A1* | 1/2009 | Zhu | | H04W 52/243 |
| | | | | | 370/338 |
| 2009/0275355 | A1* | 11/2009 | Tan | | H04W 52/0251 |
| | | | | | 455/522 |
| 2010/0037070 | A1* | 2/2010 | Brumley | | H04L 12/12 |
| | | | | | 713/300 |
| 2010/0172295 | A1* | 7/2010 | Sagfors | | H04W 52/146 |
| | | | | | 370/328 |
| 2010/0285828 | A1* | 11/2010 | Panian | | H04W 52/246 |
| | | | | | 455/522 |
| 2012/0075992 | A1* | 3/2012 | Shahidi | | H04W 52/0251 |
| | | | | | 370/235 |
| 2012/0207112 | A1* | 8/2012 | Kim | | H04W 52/146 |
| | | | | | 370/329 |
| 2013/0039173 | A1* | 2/2013 | Ehsan | | H04W 52/60 |
| | | | | | 370/229 |
| 2014/0056278 | A1* | 2/2014 | Marinier | | H04W 72/1268 |
| | | | | | 370/330 |
| 2014/0068293 | A1* | 3/2014 | Man | | G06F 1/3206 |
| | | | | | 713/320 |
| 2014/0148212 | A1* | 5/2014 | Gusavac | | H04W 52/143 |
| | | | | | 455/522 |
| 2014/0155119 | A1* | 6/2014 | Bishop | | H04W 52/28 |
| | | | | | 455/552.1 |
| 2014/0200046 | A1* | 7/2014 | Sikri | | H04W 24/02 |
| | | | | | 455/552.1 |
| 2014/0349701 | A1* | 11/2014 | Vajapeyam | | H04W 52/34 |
| | | | | | 455/522 |
| 2015/0018029 | A1* | 1/2015 | Burchill | | H04W 52/243 |
| | | | | | 455/522 |
| 2015/0181117 | A1* | 6/2015 | Park | | H04N 5/23216 |
| | | | | | 348/372 |
| 2015/0185813 | A1* | 7/2015 | Ping | | G06F 1/26 |
| | | | | | 713/323 |
| 2015/0346798 | A1* | 12/2015 | Dongara | | G06F 1/3296 |
| | | | | | 713/320 |
| 2015/0370301 | A1* | 12/2015 | Bolan | | G06F 1/30 |
| | | | | | 713/322 |
| 2016/0044608 | A1* | 2/2016 | Denic | | H04W 52/0219 |
| | | | | | 370/315 |
| 2016/0066266 | A1* | 3/2016 | Law | | H04W 52/028 |
| | | | | | 455/574 |
| 2016/0174161 | A1* | 6/2016 | Seo | | H04W 52/346 |
| | | | | | 455/522 |
| 2016/0179164 | A1* | 6/2016 | Park | | G06F 1/3243 |
| | | | | | 713/322 |
| 2016/0295627 | A1* | 10/2016 | Karout | | H04W 40/12 |
| 2017/0013565 | A1* | 1/2017 | Pelletier | | H04W 52/365 |
| 2017/0070071 | A1* | 3/2017 | Han | | G06F 1/3296 |
| 2017/0086137 | A1* | 3/2017 | Sun | | H04W 52/346 |
| 2017/0181107 | A1* | 6/2017 | Roji | | H04B 1/04 |
| 2017/0269669 | A1* | 9/2017 | Choi | | G11C 16/30 |
| 2017/0273032 | A1* | 9/2017 | Qin | | H04W 52/346 |
| 2017/0284731 | A1* | 10/2017 | Smith | | H05B 1/0258 |
| 2017/0339713 | A1* | 11/2017 | Kimura | | H04L 5/003 |
| 2018/0263002 | A1* | 9/2018 | Hu | | H04L 5/001 |
| 2018/0302864 | A1* | 10/2018 | Nigam | | H04W 52/325 |
| 2018/0332604 | A1* | 11/2018 | Lee | | H04W 72/1284 |
| 2019/0053242 | A1* | 2/2019 | Akula | | H04W 72/0413 |

\* cited by examiner

DEVICES AND METHODS FOR POWER ALLOCATION

TECHNICAL FIELD

Various aspects relate generally to power allocation for devices configured for wireless communications.

BACKGROUND

Terminal device peak power (Pmax) requirements have been growing from generation to generation, driven by a continuing trend of increased compute requirements, for example graphics, core count, and input/output (I/O) capabilities, e.g. memory bandwidth and timing parameters. At the same time, power delivery capabilities have not increased to account for these increased compute requirements, thereby effectively limiting or reducing the amount of peak power available to a terminal device's other components, e.g. a device's Application Processor (AP, or System on Chip (SoC)).

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
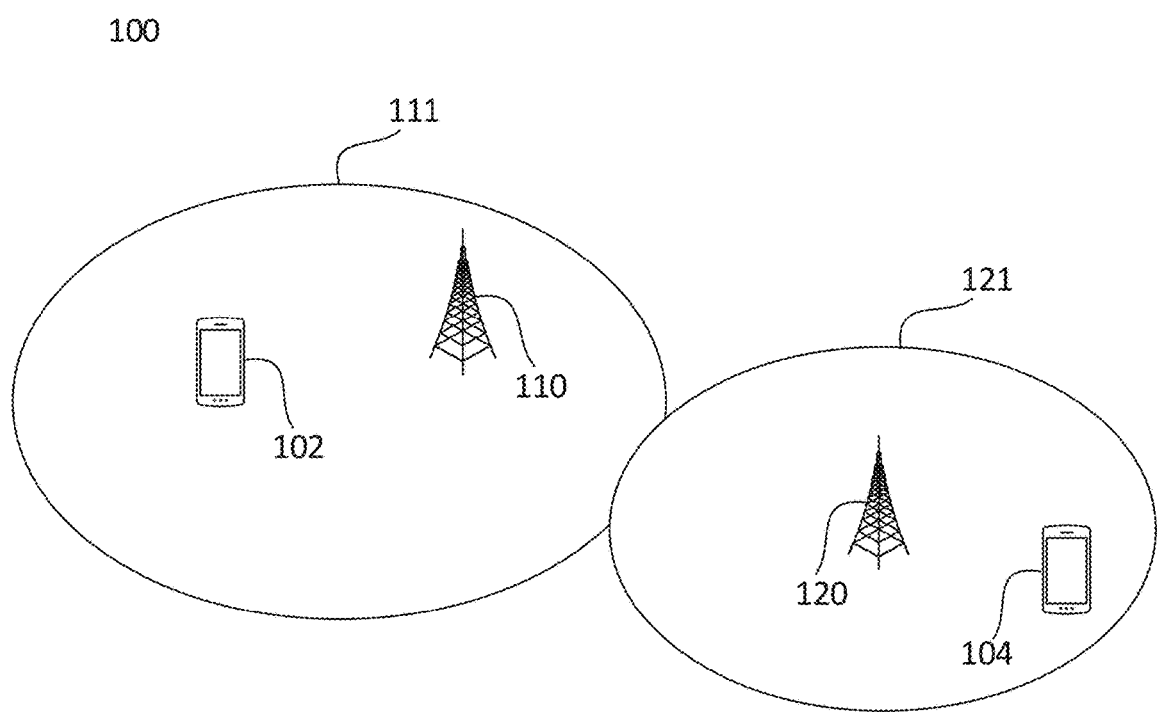
FIG. 1 shows an exemplary radio communication network according to some aspects.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

The terms "circuit" or "circuitry" as used herein are understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "software" refers to any type of executable instruction, including firmware.

The term "terminal device" utilized herein refers to user-side devices (both mobile and immobile) that can connect to a core network and various external networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld electronic devices, consumer/home/office/commercial appliances, vehicles, and any other electronic device capable of user-side wireless communications. Without loss of generality, in some cases terminal devices can also include application-layer components, such as application processors or other general processing components, that are directed to functionality other than wireless communications. Terminal devices can also support wired communications in addition to wireless communications. Furthermore, terminal devices can include vehicular communication devices that function as terminal devices.

The term "network access node" as utilized herein refers to a network-side device that provides a radio access network with which terminal devices can connect and exchange information with other networks through the network access node. "Network access nodes" can include any type of base station or access point, including macro base stations, micro base stations, NodeBs, evolved NodeBs (eNodeBs or eNBs), Home eNodeBs, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, mobile cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where each cell is characterized by a distinct communication channel. Furthermore, the term "cell" may be utilized to refer to any of a macrocell, microcell, femtocell, picocell, etc. Certain communication devices can act as both terminal devices and network access nodes, such as a terminal device that provides a network connection for other terminal devices.

The term "base station" used in reference to an access point of a mobile communication network may be understood as a macro base station, micro base station, Node B, evolved NodeB (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

Various aspects of this disclosure may utilize or be related to radio communication technologies. While some examples may refer to specific radio communication technologies, these examples are demonstrative and may be analogously applied to other radio communication technologies, including, but not limited to, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-SCDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10) 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.1 lad, IEEE 802.1 lay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems, and other existing, developing, or future radio communication technologies. Aspects described herein may use such radio communication technologies according to various spectrum management schemes, including, but not limited to, dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies), and may be use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, aspects described herein can also employ radio communication technologies on a secondary basis on bands such as the TV White Space bands (typically below 790 MHz) where in particular the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, aspects described herein may also use radio communication technologies with a hierarchical application, such as by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc. Aspects described herein can also use radio communication technologies with different Single Carrier or OFDM flavors (CP-OFDM, SC-FDMA, SC-OFDM, filter bank-based multicarrier (FBMC), OFDMA, etc.) and in particular 3GPP NR (New Radio), which can include allocating the OFDM carrier data bit vectors to the corresponding symbol resources.

For purposes of this disclosure, radio communication technologies may be classified as one of a Short Range radio communication technology or Cellular Wide Area radio communication technology. Short Range radio communication technologies include Bluetooth, WLAN (e.g. according to any IEEE 802.11 standard), and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g. according to an IEEE 802.16 radio communication standard, e.g. WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples. Furthermore, as used herein the term GSM refers to both circuit- and packet-switched GSM, including, for example, GPRS, EDGE, and any other related GSM technologies. Likewise, the term UMTS refers to both circuit- and packet-switched UMTS, including, for example, HSPA, HSDPA/HSUPA, HSDPA+/HSUPA+, and any other related UMTS technologies. As used herein, a first radio communication technology is different from a second radio communication technology if the first and second radio communication technologies are based on different communication standards.

The term "network" as utilized herein, e.g. in reference to a communication network such as a radio communication network, encompasses both an access section of a network (e.g. a radio access network (RAN) section) and a core section of a network (e.g. a core network section). The term "radio idle mode" or "radio idle state" used herein in reference to a terminal device refers to a radio control state in which the terminal device is not allocated at least one dedicated communication channel of a mobile communication network. The term "radio connected mode" or "radio connected state" used in reference to a terminal device refers to a radio control state in which the terminal device is allocated at least one dedicated uplink communication channel of a radio communication network.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor may transmit or receive data in the form of radio signals with another processor, where the physical transmission and reception is handled by radio-layer components such as RF transceivers and antennas, and the logical transmission and reception is performed by the processor. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

FIG. 1 shows exemplary radio communication network 100 according to some aspects, which may include terminal devices 102 and 104, access nodes (i.e. network access points) 110 and 120 with corresponding coverage regions (i.e. cells) 111 and 121, respectively. Communication network 100 may communicate via network access nodes 110 and 120 with terminal devices 102 and 104 via various mechanisms. Although certain examples described herein may refer to a particular radio access network context (e.g., LTE, UMTS, GSM, other 3rd Generation Partnership Project (3GPP) networks, WLAN/WiFi, Bluetooth, 5G, mmWave, etc.), these examples are demonstrative and may therefore be analogously applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, e.g. for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

Figure 2:
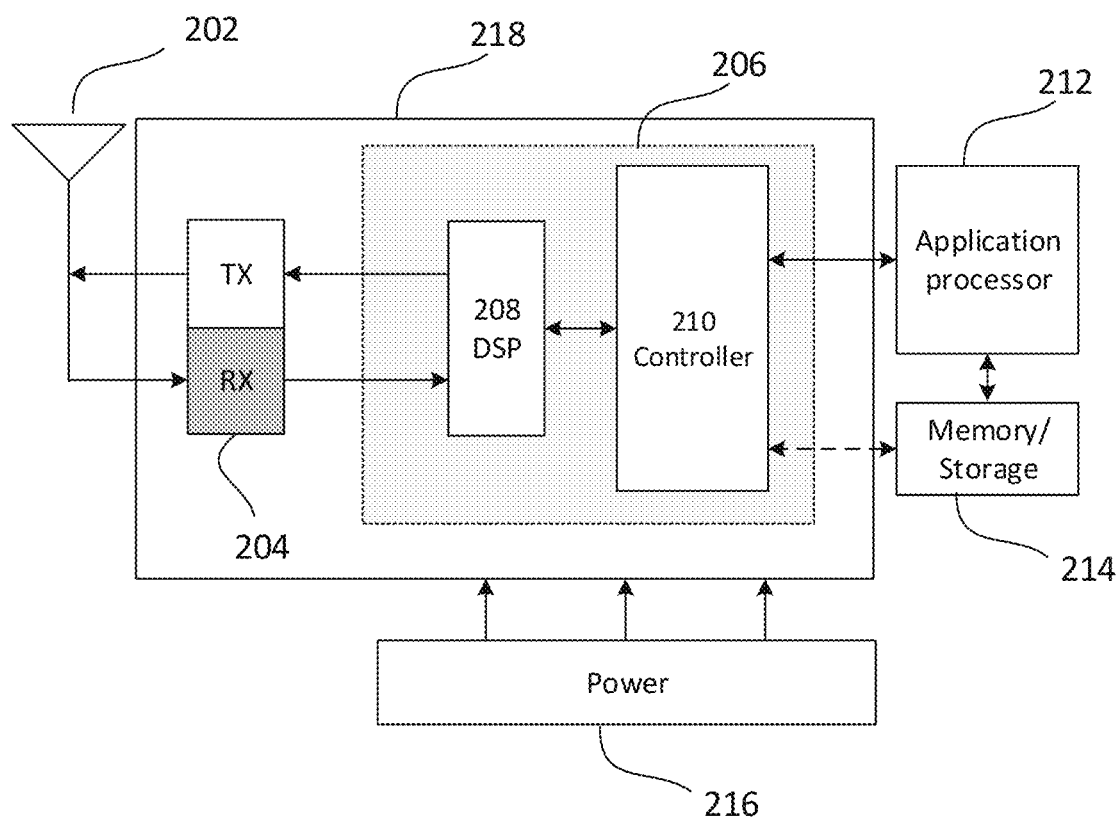
FIG. 2 shows an internal configuration of terminal device according to some aspects.

FIG. 2 shows an internal configuration of terminal device 102 according to some aspects, which may include antenna system 202, radio frequency (RF) transceiver 204, baseband modem 206 (including digital signal processor 208 and controller 210), application processor 212, memory 214, and power supply 216. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 in order to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the RF transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by controller 210 for transmission via RF transceiver 204, and, in the receive path, prepare incoming received data provided by RF transceiver 204 for processing by controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancellation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium, which may include data stored in on-chip memory such as SRAM, register files, or external DRAM), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions of the radio communication technologies, while controller 210 may be responsible for upper-layer protocol stack functions. Controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Controller 210 may be structurally embodied as a protocol processor configured to execute protocol software (retrieved from a controller memory) and subsequently control the radio communication components of terminal device 102 in order to transmit and receive communication signals in accordance with the corresponding protocol control logic defined in the protocol software. Controller 210 may include one or more processors configured to retrieve and execute program code that defines the upper-layer protocol stack logic for one or more radio communication technologies, which can include Data Link Layer/Layer 2 and Network Layer/Layer 3 functions. Controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by controller 210 may include executable instructions that define the logic of such functions.

Accordingly, baseband modem 206 may be configured to implement the methods and/or algorithms described in this disclosure.

In some aspects, terminal device 102 may be configured to transmit and receive data according to multiple radio communication technologies. Accordingly, in some aspects one or more of antenna system 202, RF transceiver 204, digital signal processor 208, and controller 210 may include separate components or instances dedicated to different radio communication technologies and/or unified components that are shared between different radio communication technologies. For example, in some aspects controller 210 may be configured to execute multiple protocol stacks, each dedicated to a different radio communication technology and either at the same processor or different processors. In some aspects, digital signal processor 208 may include separate processors and/or hardware accelerators that are dedicated to different respective radio communication technologies, and/or one or more processors and/or hardware accelerators that are shared between multiple radio communication technologies. In some aspects, RF transceiver 204 may include separate RF circuitry sections dedicated to different respective radio communication technologies, and/or RF circuitry sections shared between multiple radio communication technologies. In some aspects, antenna system 202 may include separate antennas dedicated to different respective radio communication technologies, and/or antennas shared between multiple radio communication technologies. Accordingly, while antenna system 202, RF transceiver 204, digital signal processor 208, and controller 210 are shown as individual components in FIG. 3, in some aspects antenna system 202, RF transceiver 204, digital signal processor 208, and/or controller 210 can encompass separate components dedicated to different radio communication technologies.

Accordingly, RF transceiver 204 and baseband modem 206 (including the digital signal processor 208 and controller 210) may collectively be referred to as cellular modem 218.

Figure 3:
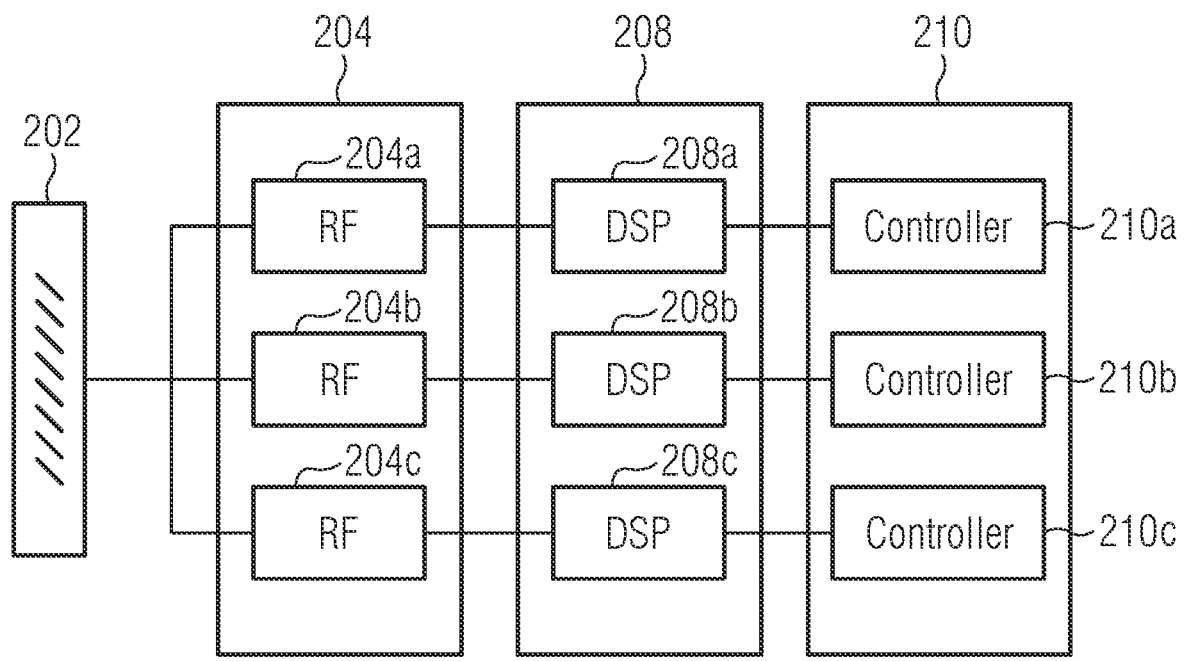
FIG. 3 shows an exemplary configuration of signal acquisition and processing circuitry according to some aspects.

FIG. 3 shows an example in which RF transceiver 204 includes RF transceiver 204a for a first radio communication technology, RF transceiver 204b for a second radio communication technology, and RF transceiver 204c for a third radio communication technology. Likewise, digital signal processor 208 includes digital signal processor 208a for the first radio communication technology, digital signal processor 208b for the second radio communication technology, and digital signal processor 208c for the third radio communication technology. Similarly, controller 210 may include controller 210a for the first radio communication technology, controller 210b for the second radio communication technology, and controller 210c for the third radio communication technology. RF transceiver 204a, digital signal processor 208a, and controller 210a thus form a communication arrangement (e.g., the hardware and software components dedicated to a particular radio communication technology) for the first radio communication technology, RF transceiver 204b, digital signal processor 208b, and controller 210b thus form a communication arrangement for the second radio communication technology, and RF transceiver 204c, digital signal processor 208c, and controller 210c thus form a communication arrangement for the third radio communication technology. While depicted as being logically separate in FIG. 4, any components of the communication arrangements may be integrated into a common component.

Terminal device 102 may also include application processor 212, memory 214, and power supply 212. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory/storage 214 may embody a memory and/or storage components of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc. Memory/storage 214 may include a plurality of different components incorporated into terminal device 102, each of which serve different functions. For example, flash memory or a solid-state disk may be connected to the Applications Processor 212 and function as storage. Also, there may be Double data rate synchronous dynamic random-access memories (DDR SDRAMs) connected to the Application Processor 212 and the baseband modem processor. The whole software image (e.g. operating system, application layers, and modem software) may be stored, for example, in flash memory and loaded into the respective DDR-SDRAMs during boot. The processors of the Application Processor and/or the baseband modem may then execute the instructions from the DDR-SDRAM(s).

Power supply 216 may be an electrical power source that provides power to the various electrical components of terminal device 102. Depending on the design of terminal device 102, power supply 216 may be a 'definite' power source such as a battery (rechargeable or disposable) or an 'indefinite' power source such as a wired electrical connection. Operation of the various components of terminal device 102 may thus pull electrical power from power supply 216.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select between the available network access nodes in order to maintain a strong radio access connection with the radio access network of radio communication network 100. For example, terminal device 102 may establish a radio access connection with network access node 110 while terminal device 104 may establish a radio access connection with network access node 112. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios. Or, for example, terminal devices 102 or 104 may seek to switch to enhanced coverage from normal coverage if the respective network access node on which they are camped on supports enhanced coverage. By switching to enhanced coverage mode, terminal device 102 or 104 may increase the repetition in signaling with their respective network access node and/or increase signal transmission power to improve communications.

Figure 4:
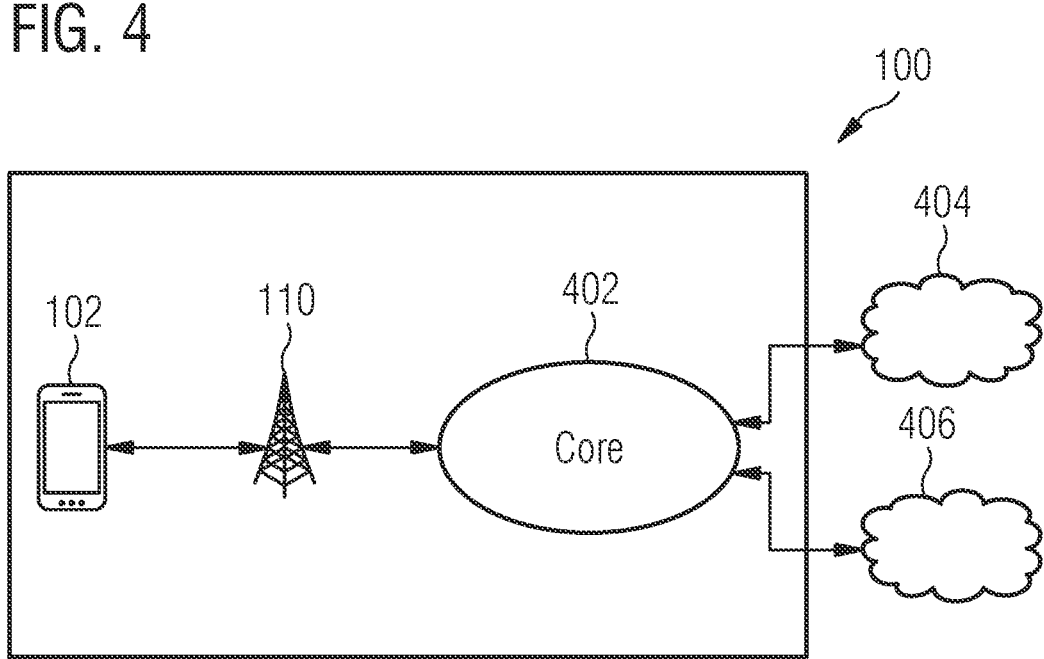
FIG. 4 shows an exemplary configuration of a network access node interfacing with core network according to some aspects.

As previously indicated, network access nodes 110 and 112 may interface with a core network. FIG. 4 shows an exemplary configuration in accordance with some aspects where network access node 110 interfaces with core network 402, which may be a cellular core network. Core network 402 may provide a variety of functions essential to operation of radio communication network 100, such as data routing, authenticating and managing users/subscribers, interfacing with external networks, and various network control tasks. Core network 402 may therefore provide an infrastructure to route data between terminal device 102 and various external networks such as data network 404 and data network 406. Terminal device 102 may thus rely on the radio access network provided by network access node 110 to wirelessly transmit and receive data with network access node 110, which may then provide the data to core network 402 for further routing to external locations such as data networks 404 and 406 (which may be packet data networks (PDNs)).

Terminal device 102 may therefore establish a data connection with data network 404 and/or data network 406 that relies on network access node 110 and core network 402 for data transfer and routing.

The methods and devices of this disclosure provide for power management mechanisms for improving system performance.

As the complexity of System on Chips (SoC) continues to increase, the Peak Power (Pmax) requirements of these more complex and capable SoC will continue to increase as well.

Reducing the SoC peak power budget can have a significant impact on the SoC's operating frequency. Since SoC power is highly dependent on system workload, it can peak unpredictably and virtually instantaneously. To ensure that SoC power never exceeds its Pmax budget allocation, its operating frequency has to be proactively controlled/limited to ensure that any power spike does not violate the Pmax limit.

Platform peak power budget is allocated to a terminal device's many different components, including, for example, display; cameras; modem and connectivity (e.g. 206, 204 in FIG. 2); memory and storage (e.g. 214 in FIG. 2); and the SoC (i.e. the application processor, e.g. 212 in FIG. 2). These components each have respective Pmax power levels and can peak independently of each other on very short time scales, e.g. in microseconds. While it is unlikely, from a statistical probability standpoint, that all system components will exhibit a power peak at the same time, given that component peak power is not controlled, current systems take a conservative approach and calculate system Pmax as the sum or some function (e.g. root mean square (RMS) function) of all of its components' peak power (i.e. highest peak power). While this approach affords protection, it comes with significant loss in system performance by sacrificing power.

Figure 5:
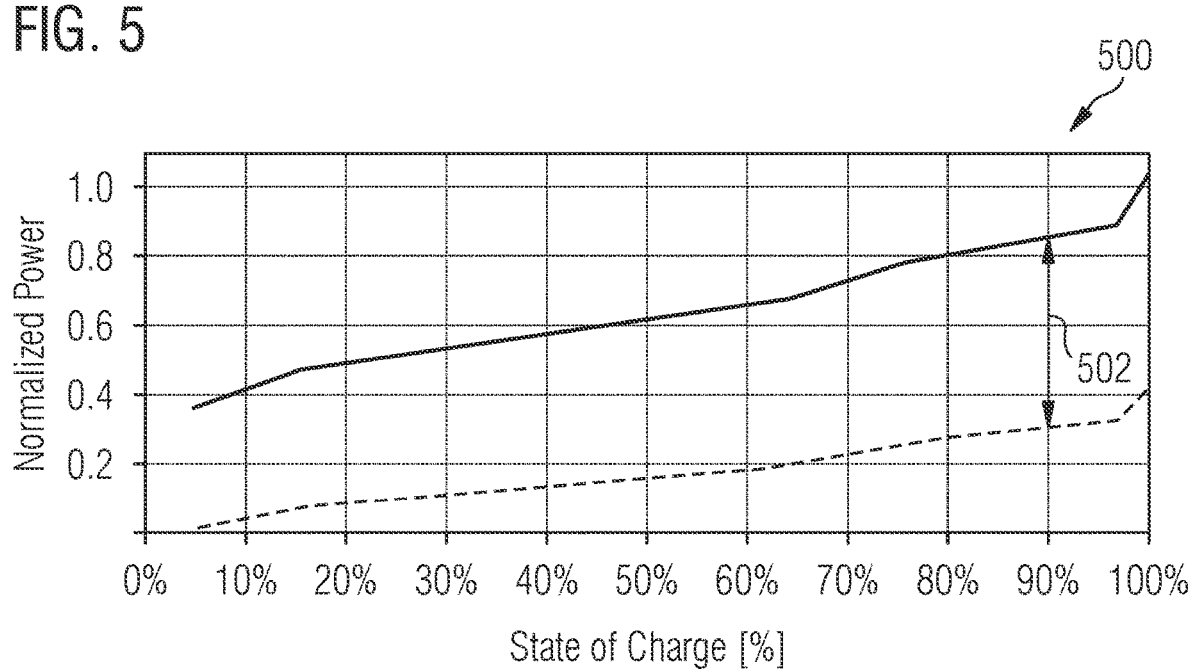
FIG. 5 shows a graph illustrating the power margin between Pmax limit and platform operating power in current systems employing the worst case approach to protect against Pmax events according to some aspects.

FIG. 5 is a graph 500 showing the power margin between Pmax limit and the normalized platform operating power in current systems employing the worst case approach to protect against Pmax events in some aspects. This undervoltage protection margin is shown by 502. The solid line shows the platform power capability, while the dashed line shows the power budget allocated by current systems. The y-axis has been normalized with respect to a full state of charge.

For example, at 50% state of charge, platform power delivery has approximately 0.6 of normalized power capability, however, the platform power budget available for executing the average system workload is set (controlled) not to exceed 0.25 of the normalized power capability to account for worst case peak power events across all system components. Even though such events are highly unlikely, and often not even possible, the lack of Pmax control of platform components forces the entire system to operate at a much lower level of performance to protect against undervoltage events that can abruptly shut down the system.

Cellular modem operation can be characterized by a wide range of peak power consumption levels for different typical cellular modem workloads triggered by external events, e.g. network events, over time scales of milliseconds. The timing of these network events is unpredictable from the terminal device (i.e. platform) perspective because the base station (e.g. eNodeB) scheduler controls when the cellular modem (e.g. for LTE) enters a peak power consumption workload, e.g. max throughput (t-put) downlink allocation or uplink grants at maximum transmit power level. As a result, the peak power budget allocated to the cellular modem in currently implemented platforms is typically based on a conservative corner cellular modem use case (e.g. sustained theoretical peak throughput at maximum transmit power level) and worst case operating and environmental conditions (e.g. high ambient temperatures).

Other approaches, in addition to the sum of the component' peak power described above, for computing platform Pmax include computing the average and root mean square (RMS) of the Pmax for all of the components. However, these approaches implement a protection margin as well, thereby leaving considerable amounts of power to go unused in most real-world scenarios which degrades overall system performance.

In some aspects, devices and methods dynamically manage the terminal device's peak power by following cellular modem 218 peak power consumption envelopes. A runtime peak power (Pmax) consumption estimator (implemented as hardware, software, or a combination) dynamically determines upcoming cellular modem peak power consumption events by observing internal protocol stack and physical layer state variables. This cellular modem Pmax estimator maps the upcoming events to a pre-defined cellular modem peak power state, e.g. implemented by one or more Look up Tables (LuTs) or using machine learning techniques to predict power demand and notify a platform (i.e. terminal device, UE) peak power manager (PPPM) about the upcoming cellular modem peak power demand. The Pmax estimator may therefore be configured with algorithms to calculate the Pmax during run-time based on the cellular modem state variables, such as the connected RAT (e.g. LTE). LuTs may, for example, be implemented where the algorithms are executed off-line. The PPPM dynamically determines the difference between the quasi-static worst case modem peak power budget and the modem's upcoming peak power demand and reclaims the peak power budget not used by the cellular modem and re-allocates it to other platform components, e.g. to a SoC (i.e. application processor). Similarly, if the modem's upcoming power demand increases, the power appropriate amount of power budget is reclaimed from the SoC and re-allocated to the cellular modem.

In some aspects, devices and methods are configured to predict future peak power consumption demand of a cellular modem. Modem peak power consumption is estimated during runtime by providing predictions of upcoming peak power consumption demand at least few tens of milliseconds before the power consumption peak actually occurs. A modem consumption model may be modeled as a function of the modem's internal state variables, in particular, at least one of: the connected Radio Access Technology (RAT), for example, LTE; Radio Resource Control (RRC) state; number of component carriers (CCs, which may be frequency carriers, timeslots in TDMA systems, a set of codes in CDMA systems, etc.); transmit (Tx) power levels which may include using parameters for power headroom and/or pathloss; indications which may provide information on Pmax consumption states including those from the Application Processor or Packet Data Convergence Protocol (PDCP) for uplink data to be transmitted along with its buffer size, RLC or MAC level indications including scheduling requests, or buffer status reports; number of downlink and/or uplink CCs; dynamic activation/de-activation of the CCs by the network; the Modulation Coding Scheme (MCS); Band information; or connected discontinuous reception cycle (C-DRX) state entry and/or exit indications from firmware to the Pmax estimator.

In some aspects, devices and methods are configured to predict modem peak power consumption based on thermal context information. The modem Pmax estimator considers modem throttle states and enhances the cellular modem peak power consumption demand protection with thermal state information from a modem thermal manager. The PPPM may be configured to request the cellular modem to enter a throttled state and reduces the cellular modem Pmax demand in order to reallocate parts of the cellular modem platform power budget to other platform components, e.g. the SoC (i.e. application processor). A modem thermal manager exposes printed circuit board (PCB) cross-component thermal resistances to the PPPM to evaluate cross heating effects between different platform (i.e. terminal device) components to ensure that any released cellular modem power budget is re-allocated to components having a lower thermal coupling with the modem.

In some aspects, a Pmax management mechanism allows the modem to dynamically determine its Pmax requirements and communicate them to a Platform Peak Power Manager (PPPM) which is configured to reallocate the reported unused budget to other system components (e.g. SoC, i.e. application processor). This enables the terminal device to minimize (or remove completely) the modem Pmax protection margin (e.g. as shown in FIG. 6) and improve overall system performance.

The PPPM methods and devices exhibit an improvement in processor frequency for when the modem Pmax budget is reduced in a 2-for-1 client platform. By configuring the device with a PPPM mechanisms described herein, the SoC (i.e. Application processor) is allocated power which is initially allocated to but unused by the modem, resulting in a noticeable increase in operating frequency of the SoC without compromising or weakening the overall system Pmax protection.

In some aspects, peak power (Pmax) management devices, algorithms and methods are provided in which a cellular modem is configured to dynamically compute its Pmax requirements and communicate them to a Platform Peak Power Manager (PPPM) and/or hardware (HW) power manager (HWPM). The PPPM is configured to manage slow peak power events (e.g. in the range of hundreds of milliseconds to seconds). These events may include, for example, turning the modem device on or off, transitioning from one network type to another (e.g. from LTE to 2G), etc. The HWPM is responsible for faster peak power events which need to be managed within smaller timescales, e.g. changes in transmit power or carrier aggregation requirements.

Figure 6:
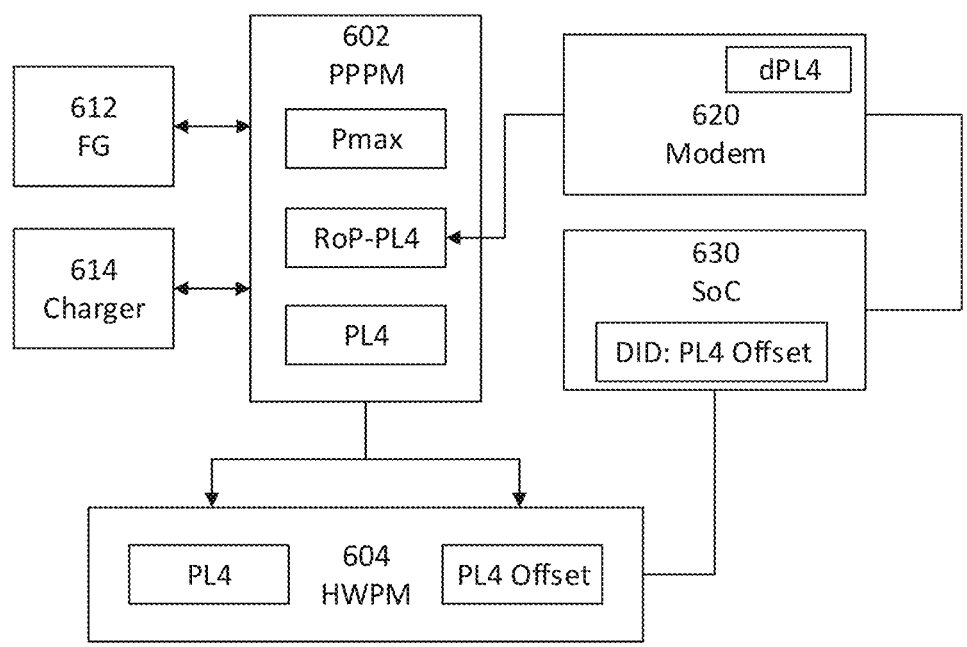
FIG. 6 shows a schematic diagram of a platform peak power manager (PPM) according to some aspects.

FIG. 6 shows a schematic diagram of a platform peak power manager (PPPM) 600 in some aspects. It is appreciated that diagram 600 is exemplary in nature and may thus be simplified for purposes of this explanation. Modem 620 may correspond to cellular modem 218 and SoC 630 may correspond to Application Processor 212 in FIG. 2, respectively. The components shown in diagram 600 may be implemented as hardware, software, or any combination thereof, in a platform, e.g. in terminal device 102.

The PPPM 602 is configured to compute the platform Pmax budget and allocate it among different platform components and the SoC, and it may be implemented in software, firmware, platform hardware, or any combination thereof. Software implementations may include platform driver, operating system (OS) service or software middleware/framework. PPPM 602 is configured to receive or compute the Pmax based on information provided by the battery Fuel Gage (FG) 612 and/or the charger 614. The exact value of platform Pmax may depend on one or more factors, including, for example: battery state of charge, voltage, temperature, system resistance, etc.

Once Pmax is computed, the PPPM 602 computes the Rest of Platform Peak power budget (RoPPL4). This budget depends on the peak power requirements of different platform components (device PL4, i.e. dPL4). In the case of modem 620, its peak power is computed based on the state of the device and the type of network it is currently connected to. When peak power requirements change (e.g. a user selects Airplane mode and turns the radio off or the network changes in between LTE and 2G), the modem 620 computes its new peak power (new Pmax) demand and provides it to the PPPM 702. The PPPM 602 uses the new Pmax request from the modem 620 to update its RoP-PL4 budget. Every time the RoP-PL4 or platform Pmax budget changes, the PPPM 602 computes a new SoC Pmax budget (PL4) and provides it to the HWPM 604. The HWPM 604 uses the PL4 to limit its operating frequency to ensure the SoC never exceeds its Pmax allocation.

The PPPM 602 is configured to ensure that platform Pmax is never exceeded by managing Pmax transitions of different platform components and the SoC. When the modem 620, for example, requests more Pmax, the PPPM 602 first computes the new RoP-PL4 and PL4 values, updates the SoC 630 with the lower PL4 and then allows the completion of the modem request. The PPPM 602 is responsible for managing slow Pmax changes that are triggered either by user actions or events that occur infrequently and can be delayed or blocked for several tens of milliseconds or more. As such, the PPPM 702 is configured to converge on stable values for Pmax, RoP-PL4 and PL4 which remain valid for several seconds and, in typical cases, perhaps even much longer.

While the PPPM 602 is configured to manage slow modem events, it may not be able to respond to peak events that occur more frequently and cannot be delayed for more than several milliseconds. For example, in current implementations, if a modem is enabled and attached to a LTE network, its peak power allocation is 5 W. However, peak power events are rare with a modem typically only needing in the range of 1 W-5 W of peak power allocation while in LTE connected mode depending on network conditions and throughput demand. Therefore, constantly allocating 5 W for modem Pmax budget is inefficient since the device does not necessarily need or use this allocated power budget for most of the time. For example, while in idle or sleep mode, the modem requires only approximately 0.5 W.

To address this misappropriation of power, the PPPM 602 is configured to dynamically compute modem Pmax demand and provide it to the SoC 630 (e.g. through the HWPM 604) in order to account for rapid changes in the modem Pmax demand based on changes in network conditions or carrier aggregation configurations as previously discussed. Furthermore, the request to change the modem Pmax cannot be delayed for more than a few milliseconds before the modem experiences the actual power peak.

In some aspects, to quickly respond and manage these fast Pmax changes, the PPPM 602 is configured to employ a determined a PL4-Offset value which represents the difference between the slow Pmax budget provided by the modem 620 to the PPPM 602 and the modem's 620 current Pmax demand. For example, using the LTE 5 W example from before, if the modem 620 determines that its current Pmax requirement is 1 W (for example, when it is in LTE RRC idle mode state), the PPPM 602 may determine the new PL4-Offset and set it to 4 W.

Once the new PL4-Offset value is computed, it is sent to the HWPM 604 which manages fast peak power events in the SoC 630. The new PL4-Offset value with a modem device ID (device ID, or DID) can be sent over platform management interfaces (e.g. PMSB) or a bus (e.g. I2C) either directly to the SoC 630 or through a chipset that supports a platform management bus interface (e.g. a Platform Controller Hub, PCH). When the SoC 630 receives the new PL4-Offset value, it updates its PL4 level, thus reclaiming (or giving back) Pmax budget that is not currently used by the modem 620. Continuing the example from above, the SoC 630 would increase its Pmax allocation by 4 W. The PL4-Offset value in the SoC is updated when a new modem Pmax change occurs and it is cleared when the PPPM 602 updates the PL4. In some aspects, a first power value used by the communication device in allocating power may include the Modem dPL4 and/or PL4-Offset.

Figure 7:
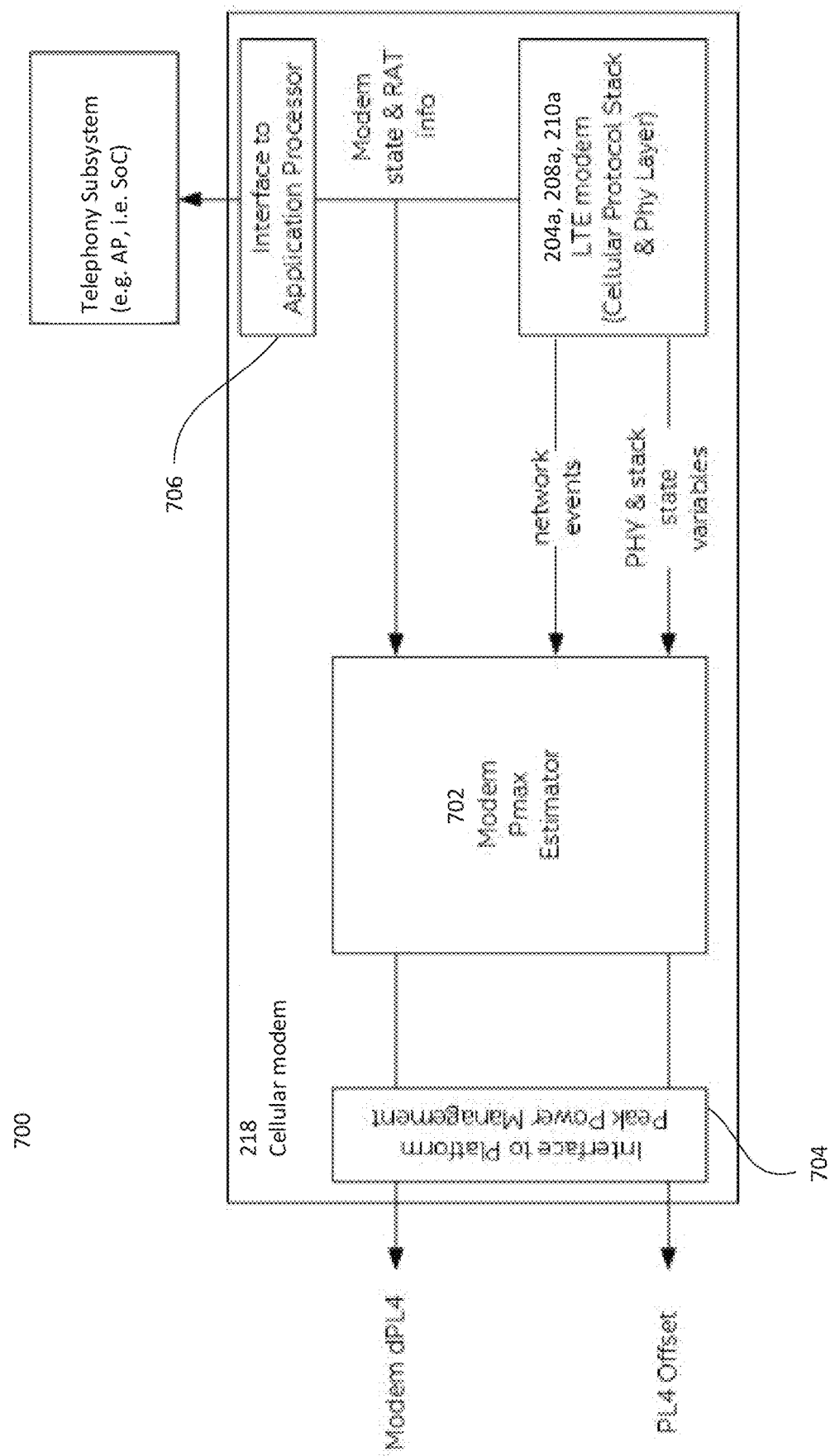
FIG. 7 shows a schematic diagram of a baseband modem with a modem Pmax estimator according to some aspects.

FIG. 7 shows a schematic diagram 700 of a cellular modem 218 with a modem Pmax estimator 702 in some aspects. It is appreciated that diagram 700 is exemplary in nature and may thus be simplified for purposes of this disclosure.

The RAT-specific modem, which for purposes of FIG. 7 is shown as the LTE modem (204a, 208a, 210a), reacts to events from the network or the use, e.g. RRC-connection establishment. Cellular modem 218 operation can be characterized by a wide range of modem Pmax consumption levels for different types of modem activities (across different types of modems, e.g. also 2G, 3G, etc.) triggering these network events over timescales of milliseconds, e.g. random access channel (RACH) procedure or reception of downlink (DL) data packets. In some aspects, the Modem Pmax Estimator 702 is configured to distinguish these activities during runtime by observing the LTE modem (204a, 208a, 210a) internal state variables. Interfaces to the different cellular modem components (e.g. 204a, 208a) are implemented, e.g. at the PHY layer which maps to the DSP 208a and the cellular protocol stack to controller 210a. These variables, for example, may include the radio access technology (RAT), e.g. LTE or 2G; the number of DL component carriers (CC); transmit (Tx) power levels; indications from the Application Processor/PDCP; etc. (including other parameters discussed herein). Additional internal state variables, such as those from the RF transceiver 204 or other thermal state variables, may also be observed. The Modem Pmax Estimator 702 uses these variables to provide modem Pmax demand at an interface to the PPPM 804. Modem Pmax Estimator 702 may be implemented into baseband modem 206 as software, firmware, hardware, or any combination thereof, and may be configured to estimate the modem Pmax levels by using a Look Up Table (LuT), or may also be implemented as a model to predict the power demand using machine learning techniques by utilizing previously mentioned modem internal parameters as machine learning or deep learning model's (e.g. Neural networks CNN/DNN/RNN/RBMs) input parameters and fitting the model on historical modem data (i.e. from modem lab/field test results) to predict more fine granular power demands. An exemplary LuT showing modem Pmax levels for modem-specific activities is shown in Table 2. These values may be, for example, determined at the time of modem development and stored in a LuT in the device. In some aspects, the LuT or machine learning model may be updated through software updates at the communication device.

TABLE 2

LTE modem Pmax model LuT

| RRC State | Modem Pmax Level | Activity |
| --- | --- | --- |
| RRC idle mode | 1 W | Idle (attached &default EPS[1] bearer established) |
| RRC connected active, single CC | 1 W | Data call, 1 CC 20 MHz, max t-put[2], cell center: 0 dB tx |
| | 3 W | Data call, 1 CC 20 MHz, max t-put, cell edge: 23 dB tx |
| | 4 W | Margin stacking for impedance antenna mismatch |
| RRC connected active, three CCs | 2 W | Data call, 3 CC 60 MHz, max t-put, cell center |
| | 4 W | Data call, 3 CC 60 MHz, max t-put, cell edge |
| | 5 W | Margin stacking for impedance antenna mismatch |

[1]Evolved Packet System
[2]maximum throughput

As can be seen in Table 2, the different Pmax levels of the modem, ranging from 1 W to 5 W, show that the modem (in most cases) requires less power than the normally allocated 5 W to account for the worst case scenario. Radio channel conditions may also impact the modem Pmax levels, as shown in Table 2, for example, location of the device in the cell (center vs. edge). However, radio channel conditions may also include antenna height, weather, changes in antenna tilt, interference, whether the UE is outside or inside, etc., Accordingly, a new PL4-Offset may be dynamically determined in order to dynamically provide increased power to the SoC.

Figure 8:
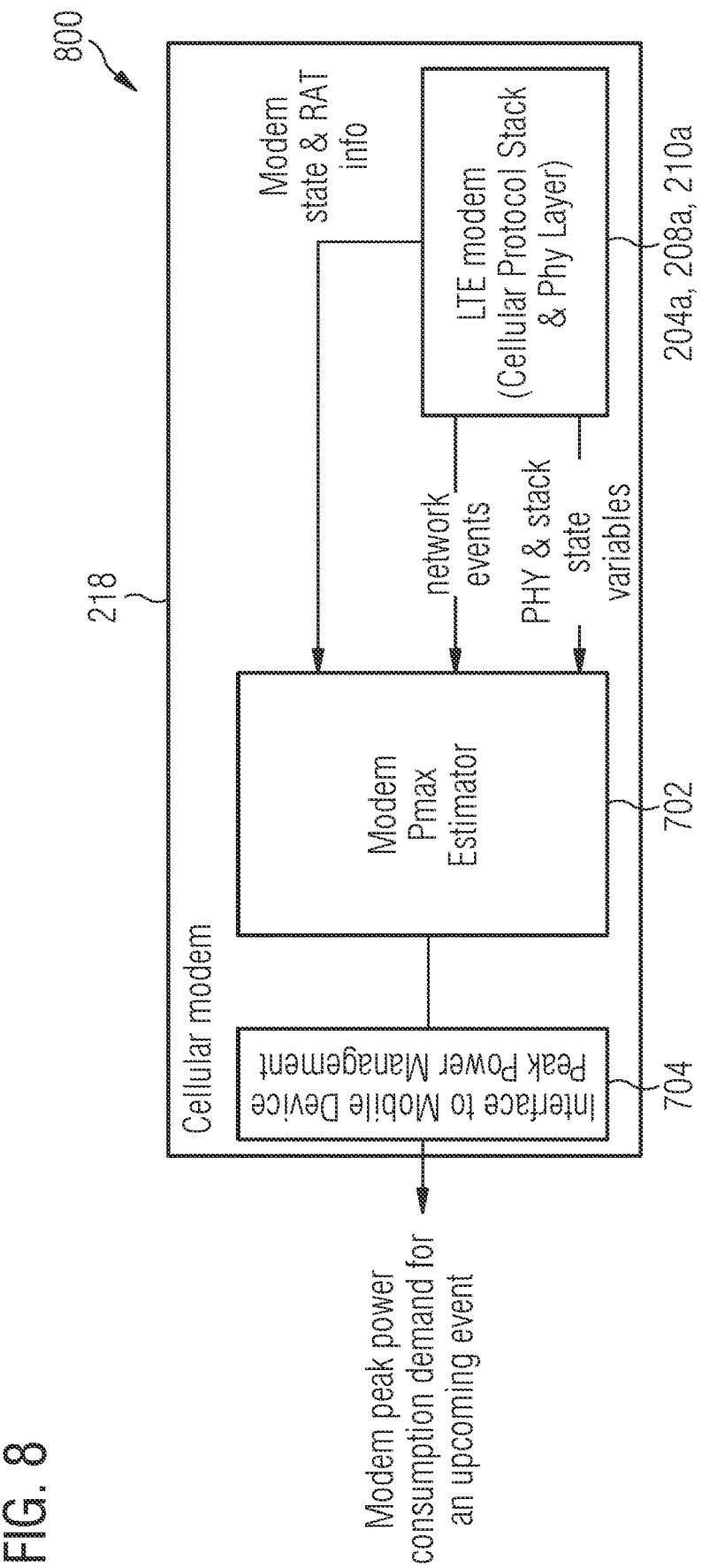
FIG. 8 shows a second schematic diagram of a baseband modem with a modem Pmax estimator according to some aspects.

FIG. 8 shows a second schematic diagram 800 of a cellular modem 218 with a modem Pmax estimator 702 in some aspects. It is appreciated that diagram 800 is exemplary in nature and may thus be simplified for purposes of this disclosure. Diagram 800 illustrates the first power value from the modem which is used to calculate the second power value for allocating power to other components of the terminal device. The LTE Cellular Protocol Stack is mapped to LTE controller 210a (for example) and the PHY layer is mapped to LTE DSP 208a of FIG. 2, for example.

In some aspects, modem Pmax estimator 702 is configured to estimate the Pmax power consumption of a cellular modem 218 during modem runtime by providing predictions of upcoming Pmax consumption demand at least few of milliseconds before the power consumption peak actually occurs. These predictions may be used by the PPPM 602 of a terminal device (e.g. 102) to increase/decrease the operating frequency of an application processor (i.e. SoC), therefore, for example, improving user experience of application with a high computational load.

Cellular modem 218 operation (and more specifically, the operation of a RAT-specific modem such as LTE modem (204a, 208a, 210a)) may be characterized by a wide range of modem Pmax consumption levels for different typical modem activities triggered by network events, such as though shown in Table 2. In some aspects, the Modem Pmax Estimator 702 is configured to define tight upper bounds for modem Pmax consumption over time scales of milliseconds.

Figure 9:
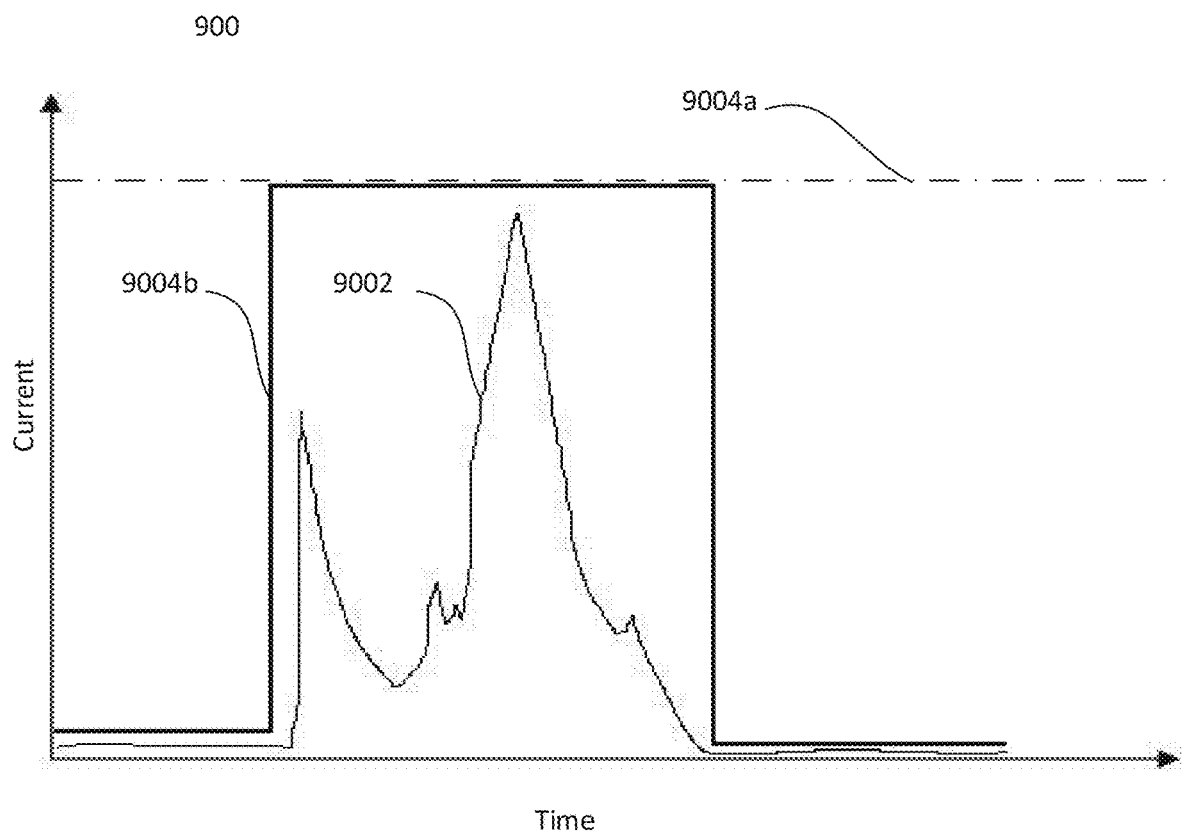
FIGS. 9 and 10 show exemplary graphs for typical LTE modem Pmax consumption according to some aspects.
Figure 10:
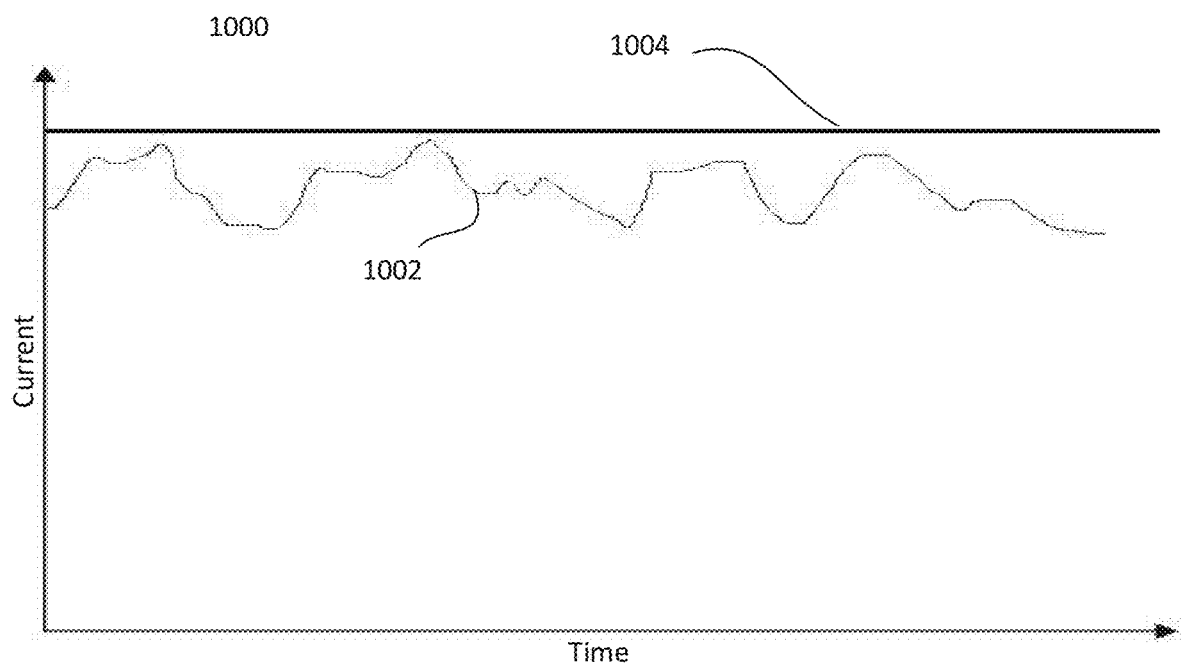

FIGS. 9 and 10 show exemplary graphs 900 and 1000 for typical LTE modem Pmax consumption. Specifically, graphs 900 and 1000 show modem power envelopes 902 and 1002 for an LTE modem in idle and connected mode, respectively.

Graph 900 depicts an LTE idle mode during deep sleep and receiving a paging reception, as seen in the peak in modem power envelope 902. Dependent on the desired accuracy, modem Pmax estimator 702 may be configured to model the idle mode Pmax by a single peak power level (shown by dashed line 904a) or may be further model the power envelope 902 by decomposing it into separate power levels to account for the paging burst and deep sleep phases (shown by solid line 904b).

Graph 1000 depicts power envelope 1002 for an LTE TDD data call at maximum throughput (t-put). Modem Pmax estimator 702 may be configured to model the LTE TDD call Pmax with line 1004.

In some aspects, the approach that the modem Pmax estimator 702 takes to determine the modem power envelopes may include reducing the granularity of the modem Pmax levels to match a required resolution of the PL4-Offsets in the platform. For example, modem power levels in 1 W steps may be used. The approach may further include selecting dominating modem power consumption model parameters from modem internal state variables. For example, the connected RAT, a Radio Resource Control protocol (RRC) state or the like, number of DL CCs, transmit (Tx) power levels, and the other parameters discussed herein may be used to distinguish modem Pmax levels of a particular modem. It is appreciated that this list is not exhaustive, and other modem internal state variables may also be considered in determining the modem power consumption model. The approach may further include adding margin to the modem Pmax levels to cover power variations due to secondary parameters, such as, for example, DL and uplink (UL) throughput, antenna mismatch, or thermal considerations. Secondary parameters may be modem internal state variables that cannot be predicted few tens of milliseconds in advance, e.g. UL grants or DL allocations, or other parameters, such as thermal parameters (e.g. on-die junction temperatures). The separation of dominating modem internal state variables and these secondary model parameters may be refined depending on modem design and configuration.

Figure 11:
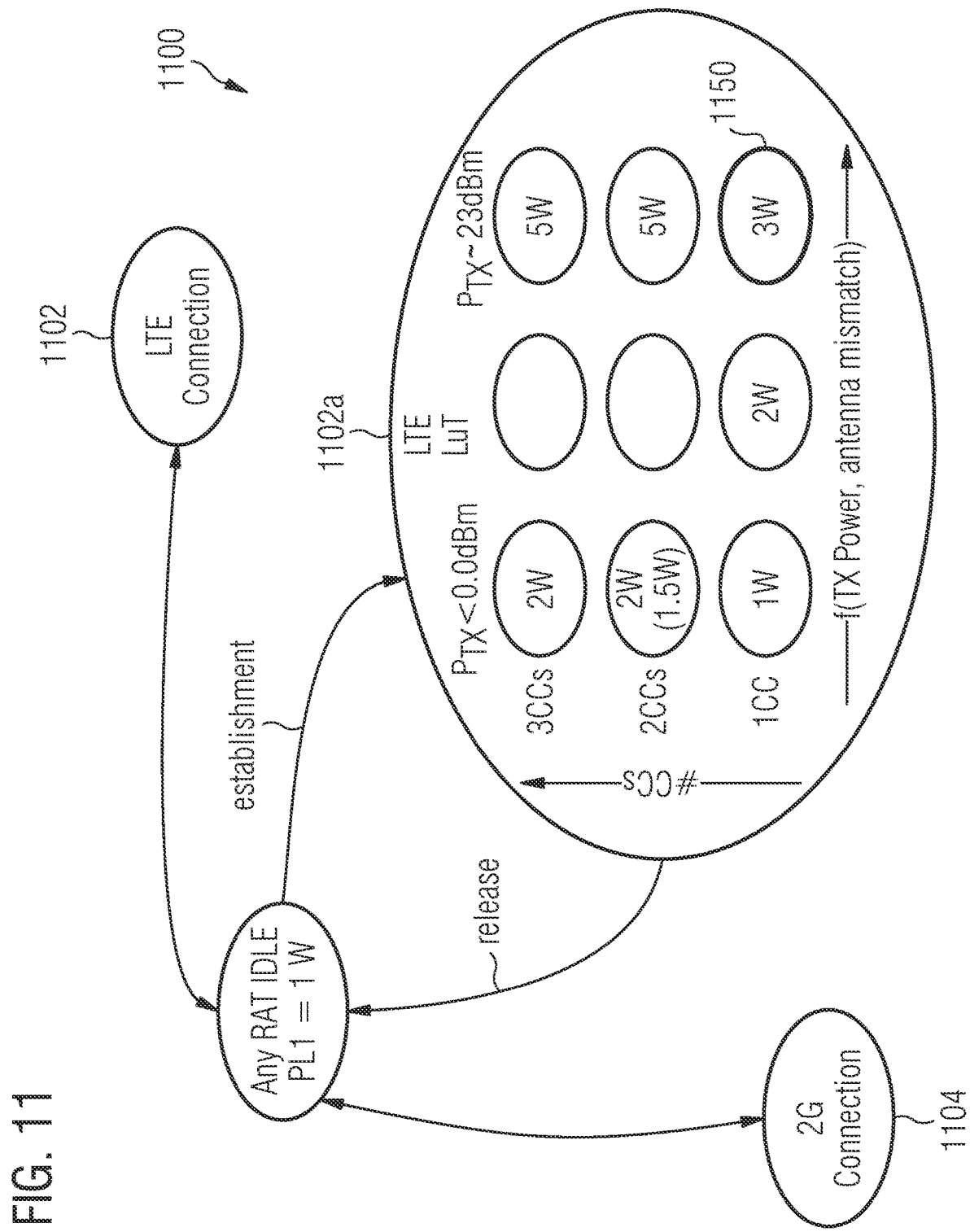
FIG. 11 shows a diagram illustrating a mapping of modem operation to modem Pmax demand according to some aspects.

FIG. 11 is a diagram 1100 showing a mapping of modem operation to modem Pmax demand in some aspects. It is appreciated that diagram 1100 is exemplary in nature and may thus be simplified for purposes of this disclosure. For example, diagram 1100 shows a process by which a Modem Pmax Estimator is configured to operate with respect to an LTE connected state and using a LuT, but it is appreciated that the ensuing explanation is equally applicable to other RATs and/or idle states, and also using machine learning models in place of LuTs. Accordingly, other connected states (e.g. on 2G) may have corresponding LuTs and/or machine learning models specifically tailored to their respective power consumption requirements.

Diagram 1100 depicts the modem Pmax model as a function of modem internal state variables, which in diagram 1100, are shown as radio access technology (RAT), RRC state, number of DL CCs, and Tx power level. The Modem Pmax Estimator may implement the model using a LuT, such as that shown in Table 2 or may also implement as a model to predict the power demand using machine learning or deep learning techniques for example neural networks and its variants (e.g. DNN/CNN/RNN/RBM) by utilizing above mentioned parameters as model input parameters and training the model on historical archived modem testing data to predict more fine granular power demands for example at the granularity of 0.5 Watt or even less. Such a model may be implemented by an algorithm, which in general, may include calculating modem Pmax demand runtime as opposed to using the LuT.

First, Modem Pmax Estimator 702 determines which RAT the cellular modem is currently connected to. In this example, the Modem Pmax Estimator 702 determines that there is an active LTE connection 1102 (could also, for example, be a 2G connection 1104; or an idle connection in any RAT, in which case 1 W may be used). Accordingly, the Modem Pmax Estimator 702 is configured to use a LuT or machine learning model (e.g. an algorithm calculating Pmax values runtime, in general) associated with connected RAT, e.g. an LTE LuT shown as 1102a. If the platform is actively connected in another RAT, then the LuT associated with that RAT is used. Once the appropriate LuT is obtained, the Modem Pmax Estimator 702 may use other internal state variables to select the most appropriate value to send to the PPPM 602. In this example, since a Tx power of 23 dBm and 1 CC is observed, the Modem Pmax Estimator 702 determines that 3 W is an appropriate Pmax value 1250.

One thing of note is that while the different Pmax levels are described in these examples are shown as being in 1 W increments, it is appreciated that other levels of granularity may be employed, for example, in 0.5 W increments, as seen in the first column, second row of 1102a (may elect 1.5 W instead of 2 W).

The Modem Pmax Estimator 702 may also be configured to dynamically react to cellular network events, e.g. RRC connection establishment, and determine the Pmax level of the triggered activity, e.g. RACH procedure or DL grants. Other common network events triggering potential modem Pmax state transitions may include, but are not limited to: measurements for cell re-selection in RRC idle mode, tracking area update (TAU), and transmit power control during active connection. At trigger events such as these, the LTE modem (204a, 208a, 210a) (or other RAT-specific modem) is configured to predict the Pmax demand of the upcoming activity according to the modem Pmax model of some aspects of the disclosure herein. In general, however, the LTE modem (204a, 208a, 210a) can neither predict the duration of the activity nor the exact timing of the trigger events because these depend on end user and network behavior.

The Modem Pmax Estimator 702 may be configured to transition to the appropriate Pmax state, i.e. select the right Pmax level, during runtime based on internal state variables which are continuously updated by mechanisms built into the 3GPP standard: RRC state changes, adding or releasing secondary cells (representing the number of CCs), power headroom reports below or above certain pre-defined thresholds (representing Tx power levels), and other parameters discussed herein. These state transitions typically happen several milliseconds and up to tens of milliseconds prior to the power consumption peak actually occurring.

Figure 12:
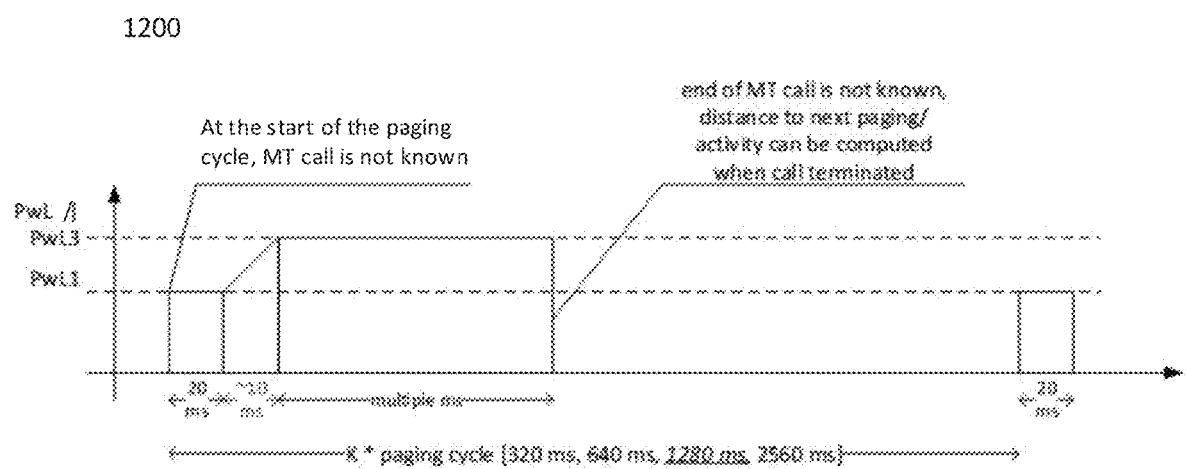
FIG. 12 shows an exemplary graph of a modem event timing and Pmax levels for a mobile terminated (MT) LTE data according to some aspects.

FIG. 12 shows an exemplary graph 1200 of a modem event timing and Pmax levels for a mobile terminated (MT) LTE data call in some aspects.

The different Pmax levels (PwL1, PwL2, and PwL 3) are shown along the y-axis and the time domain is shown on the x-axis of graph 1200, respectively (where K is any integer greater than or equal to 0). PwL1 is the modem Pmax level for LTE RRC idle mode (e.g. 1 W), and PwL2 and PwL3 designate different modem Pmax levels for RRC connected mode, e.g. 1 W and 3 W for single CC 20 MHz LTE data call at 0 dBm and 23 dBm Tx power levels, respectively. The transition from PwL1 to PwL2 or 3 is triggered when RRC connection establishment is initiated after the UE has been paged by the network.

Figure 13:
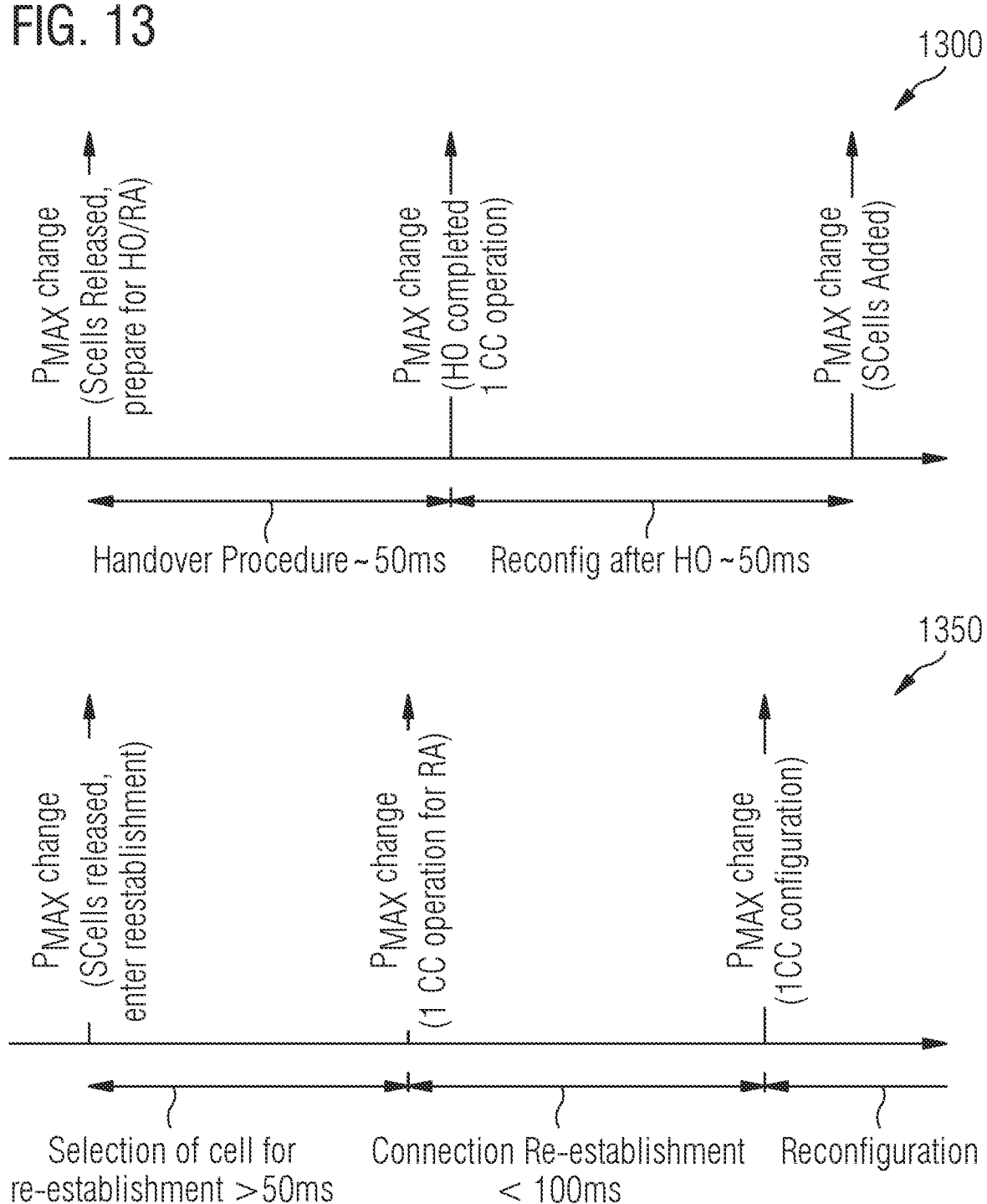
FIG. 13 shows graphs illustrating worst case Pmax events according to some aspects.

In some aspects, the immediate reporting of a new modem Pmax demand to the PPPM 602 may be done at every state transition of the Modem Pmax Estimator 702. Worst case scenarios in terms of modem Pmax demand change rate are handover and connection re-establishment with standardized deadlines between 50 ms and 100 ms for completion of 3GPP procedures, resulting in 2 or more modem Pmax demand changes in about 100 ms, as shown in graphs 1300 and 1350 of FIG. 13.

Graph 1300 shows the worst case Pmax event for handover, and graph 1350 shows the worst case Pmax event for connection re-establishment. In both graphs, the first event is a trigger for a respective procedure, e.g. the release of the secondary cell (SCell); the second event is the completion of the triggered respective procedure, e.g. completion of the RACH procedure and a new Tx power level on the new primary cell (PCell); and a third event in the re-establishment procedure which may include an RRC connection reconfiguration, e.g. the addition of a new SCell. This third event, i.e. the rrcConnectionReconfiguration message, will occur after a successful re-establishment procedure, but the UE may not receive Scell addition in the rrcConnectionReconfiguration message (accordingly, the reception of such an addition may be optional). Furthermore, there is no timer (or the like) that after a certain time interval later the rrcConnectionReconfiguration message will be received by the UE.

In some aspects, the Modem Pmax Estimator 702 filters the reporting of these events to the PPPM 602 according to pre-defined SoC-Cellular modem interface agreement requirements, e.g. according to a maximum allowed modem Pmax demand change rate.

In some aspects, the Modem Pmax Estimator 702 may be configured to utilize thermal context information, e.g. on-die temperatures or printed circuit board (PCB) temperature provided by thermal sensors, in addition to the aforementioned modem state internal variables to enhance the way it estimate Pmax consumption of a cellular modem 218 during runtime in order to provide predictions of upcoming Pmax consumption demand several millisecond up to tens of milliseconds prior to the power consumption peak actually occurring. These predictions may be used by a PPPM 602 of a terminal device to, for example, increase/decrease an operating frequency of an application processor (i.e. SoC), thereby further improving user experience of applications with high computational loads.

Figure 14:
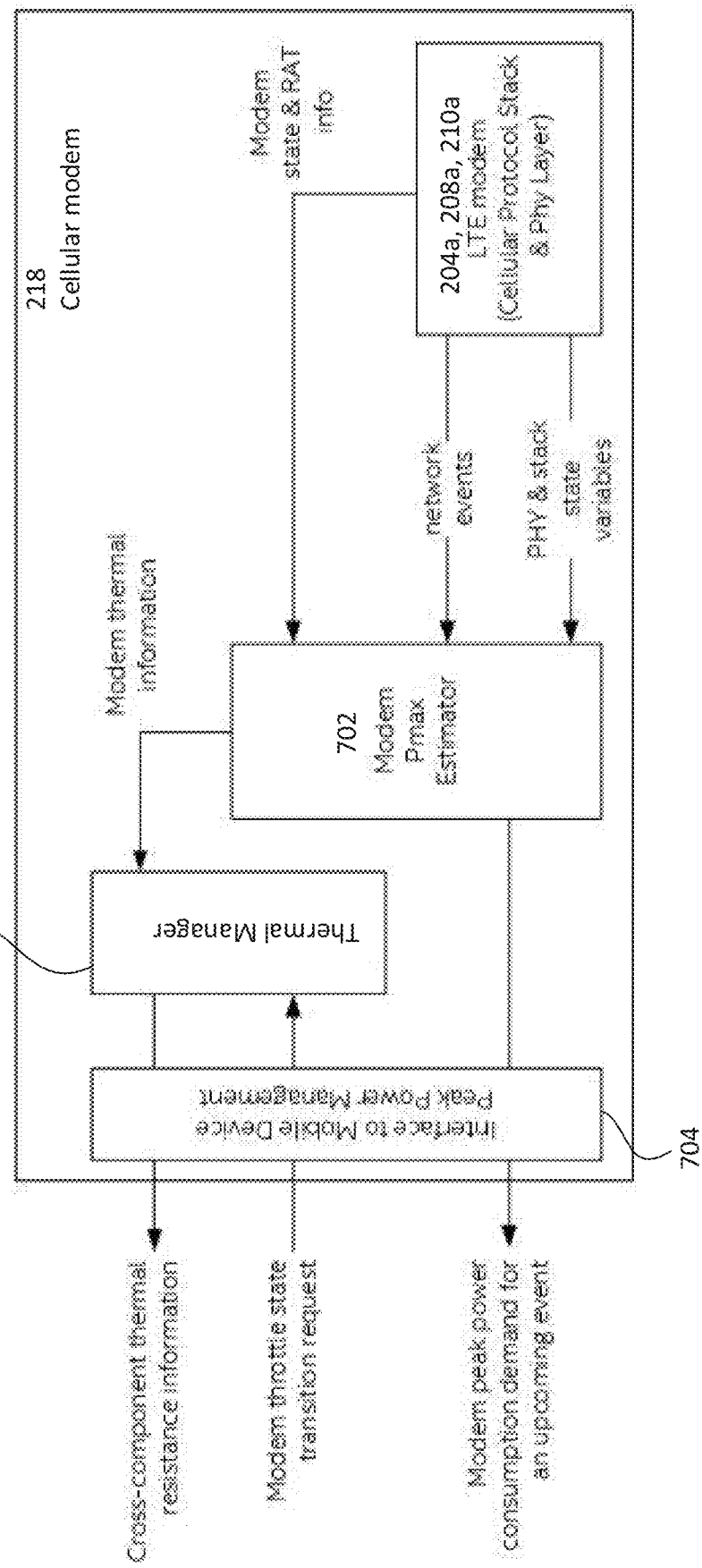
FIG. 14 shows a schematic diagram of a baseband modem with a Modem Pmax Estimator and a Thermal Manager according to some aspects.

FIG. 14 shows a schematic diagram 1400 of a cellular modem 218 with a Modem Pmax Estimator 702 and a Thermal Manager 1402 in some aspects. It is appreciated that diagram 1400 is exemplary in nature and may thus be simplified for purposes of this disclosure. It is appreciated that features of diagram 1400 are similar to other diagrams (e.g. in FIGS. 7 and 8) and thus are not discussed in detail with respect to FIG. 14.

RAT modem chips such as LTE modem (204a, 208s, 210a) are embedded with temperature sensing and data throttling capabilities that are controlled by Thermal Manager 1402, which may be implemented in software, hardware, firmware, or any combination thereof, in cellular modem 218. For example, in long duration LTE RRC connected states, self-heating may drive the cellular modem 218 towards its temperature limits. In such scenarios, the modem 218 has to limit/reduce its power level for a time (e.g. multiple seconds) in order to allow for passive cooling of the subsystem in order to avoid problems such as hitting the chip thermal runaway temperature. The cellular modem 218 peak power consumption is a function of a plurality of internal state variables, including thermal information and throttling states. During this time span, power budget will be released from the modem 218 which can be re-allocated to other components, e.g. the SoC/Application Processor, of the platform (i.e. terminal device 102). Also, once the modem 218 returns from its imposed temperature limited state, it may resume on high data traffic, and accordingly, its power budget must be increased again to higher levels, e.g. its full power budget.

Thermal manager 1402 is configured to observe the baseband modem's thermal environment and provide the PPPM 602 with information such as cross-component thermal resistance and modem throttle state transitions.

Figure 15:
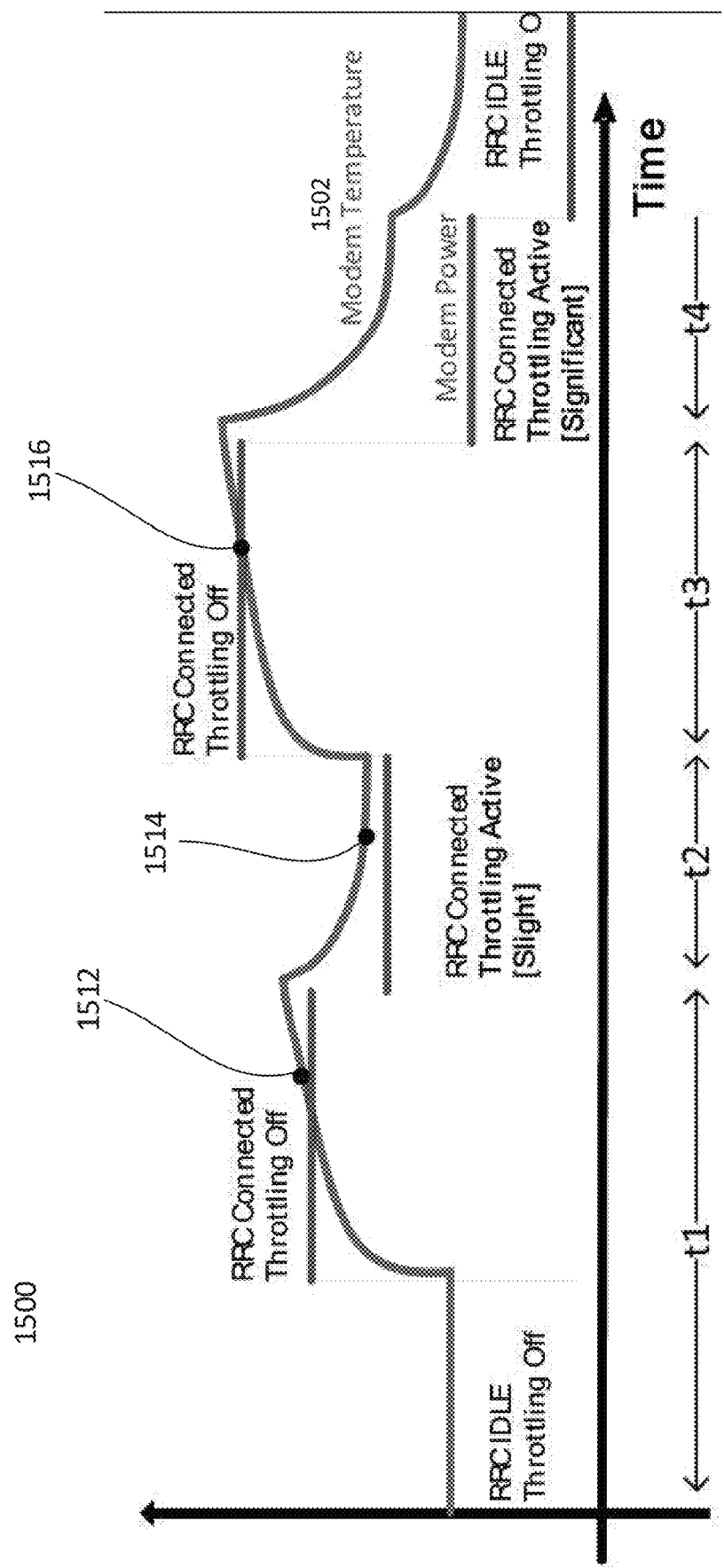
FIG. 15 shows a graph showing modem temperature and throttle state indications according to some aspects.

FIG. 15 is a graph 1500 showing modem temperature and throttle state indications which may be provided by a Thermal Manager 1402 to the PPPM 602 for dynamically allocating the power budget of a terminal device.

The Modem Temperature is shown by line 1502.

The time scales of each of t1-t4 are in the range of a couple of seconds, thereby allowing for the use of throttling state parameters in re-allocating portions of the power budget intended for the modem to other device components, e.g. the Application Processor, Bluetooth, display, speakers, etc.

At Pmax indication 1 1512, a SLIGHT throttling state may be activated to account for the rising modem temperature 1502. One-third (for example) of the modem power budget is released for a minimum time of t2 (while temperature decreases back to a predetermined value). Accordingly, this released portion of the power budget for time t2 may be reallocated to other device components by the PPPM 602.

At Pmax indication 2 1514, the temperature cooling is almost accomplished, so a burst cycle may be enabled. The full budget for modem Pmax will be required for t3.

At Pmax indication 3 1516, a SIGNIFICANT throttling state may be activated to account for the rising modem temperature 1502 (Note: this is illustrated by showing a higher temperature than that at Pmax indication 1 1512). Two-thirds (for example, in any case, a higher portion than that for the SLIGHT throttling state) is then released for time t4 in order to alleviate thermal concerns. Accordingly, the released portion of the power budget for time t4 may be reallocated to other device components by the PPPM 602.

In some aspects, an approach for implementing modem thermal information for more efficient terminal device power management is provided by accounting for the current modem thermal budget. If the modem has a high thermal budget available, there may be no restrictions to enter modem operation modes with high power consumption, e.g. data calls at maximum throughput. If the modem thermal budget is almost consumed, certain operation mode with higher power consumption may be blocked from being executed by the modem. The approach may further include observing modem throttle state information, which may indicate portions of the modem power budget which will not be used. The thermal manager 1502 may, for example, define four modem throttle states: NONE (i.e. off), SLIGHT, SIGNIFICANT, and AGGRESSIVE. Each throttling state may include releasing portions of the modem power budget in increasing portions (e.g. AGGRESSIVE may release all or close to all, of the modem power budget). The approach may further include predicting a next burst data cycle and next throttling cycle start plus duration. This information may allow the PPPM 702 to update the quasi-static worst case modem Pmax budget. The approach may further include monitoring for indication signals related to the modem needing a full power budget back within a certain amount of time, and the modem releasing a portion of the power budget for at least a certain amount of time (examples of which are explained above in explanation for FIG. 15).

In some aspects, the cellular modem 218 may send indication messages to the PPPM 602 related to modem thermal budget during RRC connected states. These messages may include whether the modem is capable of exploiting its full Pmax budget or whether its thermal capacity is limited for a given time period (i.e. in one of the throttle states for a given time period). These indication message may include a time period which indicates to the PPPM 602 how long the power budget will be needed or when the next power budget update is to be expected. Also, the PPPM 602 may be configured to request the cellular modem 218 to enter a throttled state, thereby reducing baseband modem Pmax demand in order to re-allocate parts of the modem power budget to other device components, e.g. SoC (i.e. the Application Processor).

As temperature changes over a time scale of seconds rather than milliseconds, signaling latency between the cellular modem 218 and the Application Processor 212 (i.e. SoC) will have little to no performance effects. The use of thermal information will allow for the PPPM 602 to re-allocate parts of the modem power budget to other components of the mobile device for longer durations, e.g. multiple seconds during phases of passive cellular modem cooling due to throttling.

In some aspects, the Thermal Manager 1402 may expose printed circuit board (PCB) cross-component thermal resistances to the PPPM 602 to evaluate cross heating effects between different mobile device components on the PCB. This may help to avoid the jeopardizing of passive modem cooling (i.e. throttling) when the released power budget of a baseband modem subsystem (e.g. LTE modem 204a, 208a, 210a) will be re-allocated to another component which has an unfavorable heating coefficient versus the modem hotspot. The released modem power budget may instead be reallocated to components that have a lower thermal coupling with the modem.

Figure 16:
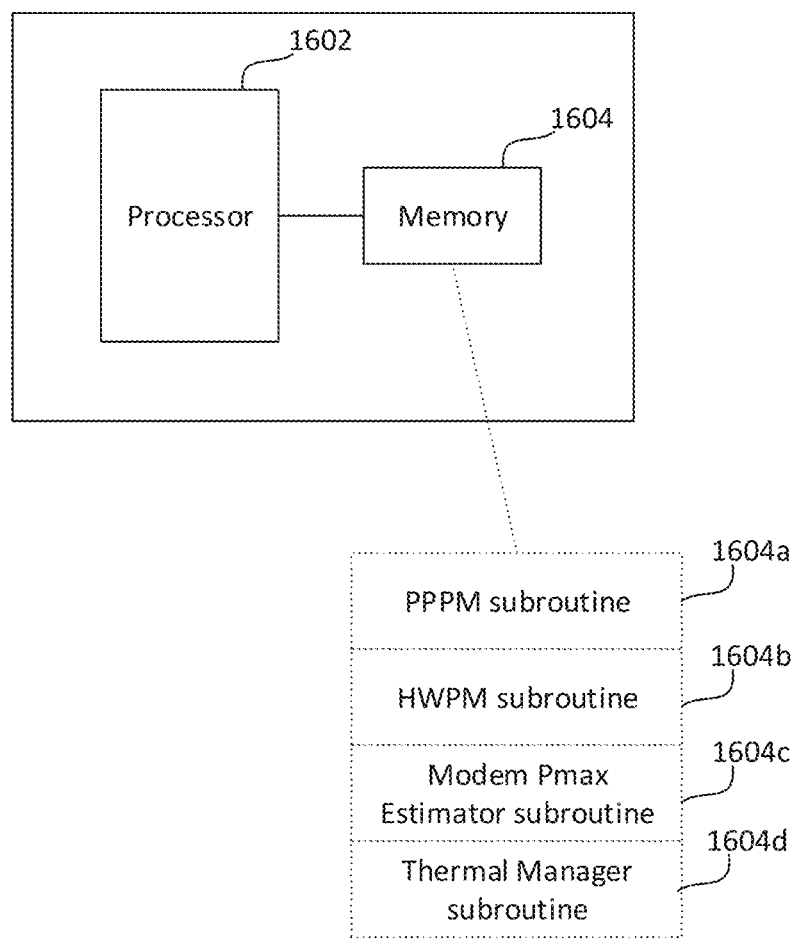
FIG. 16 shows a schematic diagram of an internal configuration of controller according to some aspects.

FIG. 16 shows another schematic diagram of an internal configuration of controller 210 according to some aspects. As shown in FIG. 16, controller 210 may include processor 1602 and memory 1604. Processor 1602 may be a single processor or multiple processors, and may be configured to retrieve and execute program code to perform the transmission and reception, channel resource allocation, and cluster management as described herein. Processor 1602 may transmit and receive data over a software-level connection that is physically transmitted as wireless signals or over physical connections. Memory 1604 may be a non-transitory computer readable medium storing instructions for one or more of PPPM subroutine 1604a, an HWPM subroutine 1604b, a Modem Pmax Estimator subroutine 1604c, and/or a thermal manager subroutine 1604d.

PPPM subroutine 1604a, an HWPM subroutine 1604b, a Modem Pmax Estimator subroutine 1604c, and/or a thermal manager subroutine 1604d may each be an instruction set including executable instructions that, when retrieved and executed by processor 1602, perform the functionality of controller 206 as described herein. In particular, processor 1602 executes PPPM subroutine 1604a to implement aspects of the PPPM 602 as described herein; processor 1602 may execute PPPM subroutine 1604b to implement aspects of the HWPM 604 as described herein; processor 1602 may execute Modem Pmax Estimator subroutine 1604c to implement aspects of the Modem Pmax Estimator 702 as described herein; and/or processor 1602 may execute Thermal Manager subroutine 1604d to implement aspects of the Thermal Manager 1402 as described herein. While shown separately within memory 1604, it is appreciated that subroutines 1604a-1604d may be combined into a single subroutine exhibiting similar total functionality. By executing the one or more of subroutines 1604a-1604d, a terminal device may be configured to dynamically manage its power budget in order to improve device performance.

Figure 17:
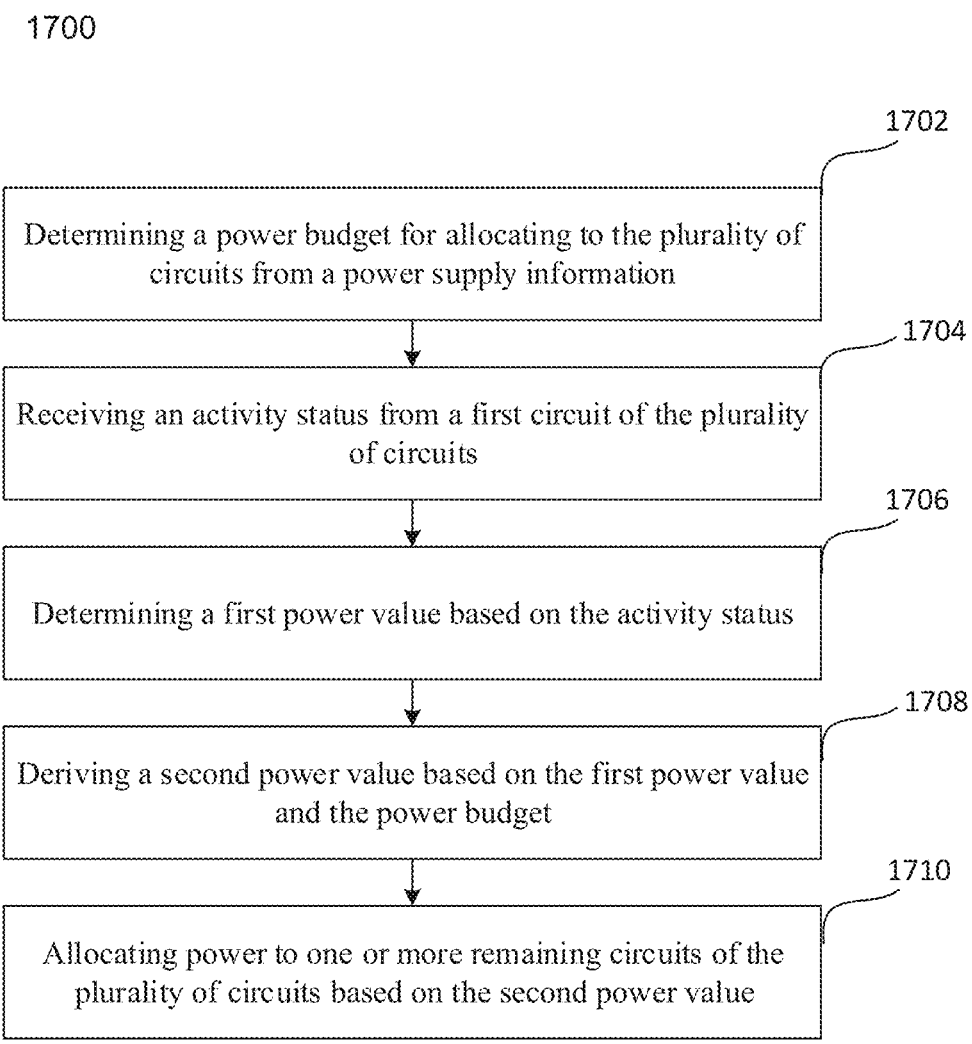
FIG. 17 shows a flowchart according to some aspects.

FIG. 17 shows a flowchart 1700 according to some aspects. It is appreciated that flowchart 1700 is exemplary in nature and may therefore be simplified for purposes of this explanation.

Flowchart 1700 illustrates a method for allocating power among a plurality of circuits in a communication device. In 1702, a power budget is determined for allocating to the plurality of circuits from a power supply information. In 1704, an activity status is received from a first circuit of the plurality of circuits. In 1706, a first power value is determined based on the activity status. In 1708, a second power value is derived based on the first power value and the power budget. In 1710, power is allocated to one or more remaining circuits of the plurality of circuits based on the second power value.

In some aspects, devices and methods for configuring a plurality of processing blocks (e.g. Fast Fourier Transform (FFT) processing circuits or any processing blocks configured for signal transmission/reception and/or application processing) on a chip of a communication device specific to a battery providing power to communication device may be implemented. For example, battery discharge characteristics may be observed and implemented into a battery discharge controller to provide improved battery life of communication devices.

Wireless mobile communications continues to be one of the most challenging processing performance systems, implementing multiple units of heterogeneous and homogenous processing architectures including a plurality of processing blocks. In some aspects, partitioning of hardware and software between serial and parallel resources is exploited in order to improve overall device performance.

The capacity of NiMH, Li-Ion batteries may decrease in many different manners depending on the wide range of load conditions. For example, a wide range of discharging modes are experiences due to loads ranging anywhere from constant, low loads to a high, pulsed loads. In terms of optimizing longevity, it is preferred to maintain a battery at moderate current at a constant discharge rather than a pulsed (i.e. momentarily high) load. Unfortunately, the usage scenarios in terminal devices (i.e. user equipment, UE) do not follow a single consistent scheme, and therefore, the load conditions attributed to UE usage seldom remain constant. Furthermore, battery types are generally designed either for long duties/high endurance or for heavy load current, but they are not designed for both scenarios and the many load conditions occurring in between. This tradeoff between discharge capacities, load conditions, and battery types presents difficulties for battery-driven Internet of Things (IoT) devices.

Battery discharge scenarios vary drastically due to the diverse load patterns of communication devices which leads to different impacts on battery life, e.g. high load conditions where a battery discharges at high C-rates, where 1 C is the discharge current that a battery can deliver for 1 hour before the battery voltage reaches the end-of-life point, thereby decreasing the battery life expectancy. Therefore, operations which discharge a battery beyond the specified end-of-discharge voltage (EODV) need to be minimized, if not completely eliminated. The EODV is a measured cell voltage to which a battery discharge to where ~95% of the stored energy is spent and the voltage will drop rapidly if discharging continues. The EODV, in other words, is implemented to prevent the battery from discharging beyond the specific voltage. The EODCV is typically higher for normal loads than for higher loads and/or lower operating temperatures since high load currents (or lower temperatures) lower the battery voltage, so the EODV is set lower to avoid premature cut-off. Therefore, the load should be adapted in such a way to keep the battery state of charge around a midpoint voltage (MPV, the voltage is measured when the battery has discharged 50% of its total energy).

Therefore, in some aspects, the devices and methods herein provide solutions to the problem of controlling a terminal device (e.g. such as an IoT device, UE, etc.) in order to maintain it at an optimal working point in terms of current drain (discharge) so that the battery discharge time is prolonged, independent of the type of battery that is used. Current implementations include fixed and static number of parallel and/or serial data processing blocks which operate in a manner regardless of the effects of load balancing.

Figure 18:
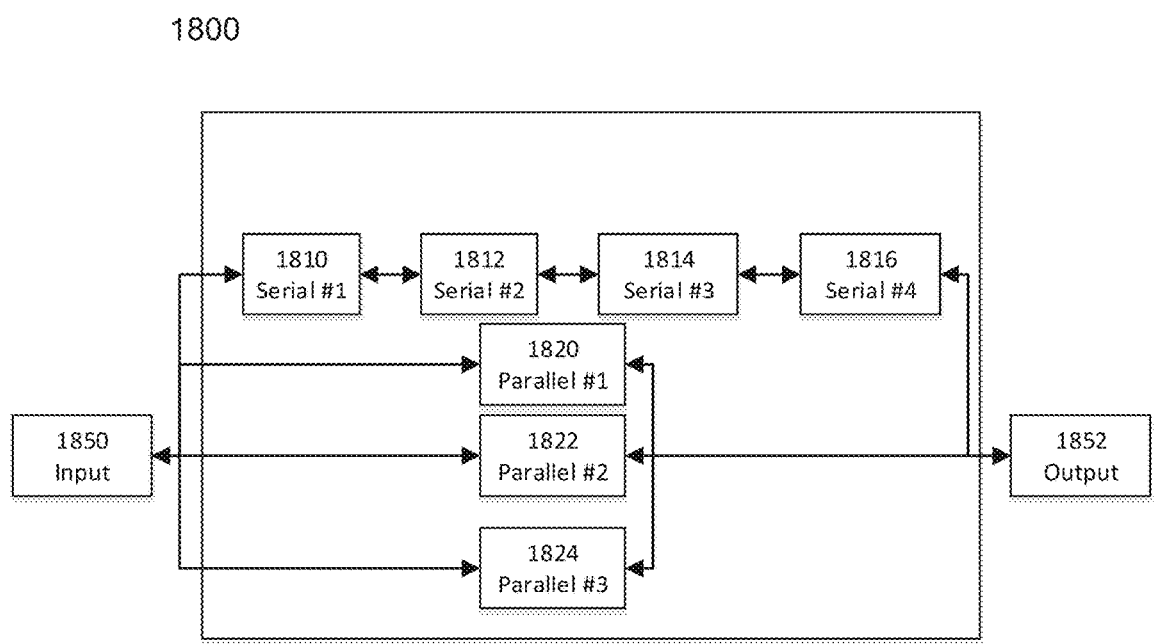
FIG. 18 shows system implementing a rigid architecture.

FIG. 18 shows a system 1800 implementing a rigid architecture. It is appreciated that system 1800 is exemplary in nature and may thus be simplified for purposes of this explanation. For example, while only seven processing blocks (1810-1816 and 1820-1824) are shown, it is readily understood that the ensuing explanation applies to any number of processing blocks, especially larger numbers.

In system 1800, four serial processing blocks (i.e. 1810-1816) and three parallel blocks (i.e. 1820-1824) are implemented between input 1850 and output 1852. For example, system 1800 may be an Application Processor 212 or a cellular modem 218 as shown in FIG. 2, respectively. Each of the processing blocks 1810-1816 and 1820-1824 may be components of an Application Processor or a Baseband modem wherein each block is configured to perform one or more tasks, e.g. any type of wireless signal processing (e.g. such as FFT processing), application processing, graphics processing, etc. However, due to system's 1800 rigid architecture, there is no flexibility for manipulating its structure. In other words, once produced, system 1800 will always have four serial processing blocks and three parallel processing blocks with no regards to the characteristics of the battery it is subsequently connected to for a power source.

Solutions such as those shown in system 1800 are optimized either for (1) long duties and high endurance, i.e. a constant current drain, or (2) heavy load currents, i.e. pulsed high current drain, but they are not capable of being modified for one or the other due to their rigid architecture. These rigid systems attempt to maximize the battery discharge time by achieving a very local optimum for a single load condition for a very specific battery type, and completely fail to address the dependency between current drain and batter capacity for the wide ranging load condition of IoT and the different battery types. By implementing the solutions and devices herein, a prolongation of up to 25% in battery discharge time may be achieved.

In some aspects, devices and methods are configured to adapt a system load by dynamically balancing between parallel and serial processing in order to maximize performance in terms of battery state of charge thereby maximizing battery longevity. The methods and devices may scale throughout the entire stack, including hardware and/or software.

In some aspects, the principles herein may be applied from Layer 1 (PHY) processing circuits up to the Application Layer where the execution of applications may be handled in parallel and/or serial configurations. Accordingly, the load balancing may protect a system against latency at higher communication layers, such as Radio Resource Control (RRC) and Hypertext Transfer Protocol (HTTP), when properly designed and exploited in parallel sub-systems.

In some aspects, methods and devices are configured to consider one or more several factors, such as the effect of the battery current discharge rate on total processing capacity of a plurality of processing blocks of a chip based on a remaining battery capacity.

A first factor may be for a device to minimize the current drain over the longest period of time. A switched on system always has a load condition with an average minimum current drain due to necessary basic features (e.g. control functions, leakage, etc.). Accordingly, the energy efficiency of system data and signal processing blocks is maximized when this system average minimum current drain is as low as possible.

A second factor may be for a device to minimize the amount of time it spends in high load conditions. A switched on system has high performance load conditions with peak current drains due to data processing data bursts, e.g. high throughput downlink data busts in wireless communications, high graphics loads in computer games, etc. The energy efficiency of the system data and signal processing blocks is maximized when the system processes the data/signals as quickly as possible while avoiding high current peaks which quickly discharges the battery.

A third factor may be for a device to tailor a current drain to achieve an optimum level and remain as constant as possible over time specific to a battery type. The capacity of a battery is significantly reduced with increasing discharge current beyond a battery-specific optimal discharge capacity but the discharge must stop before achieving the battery-specific EODV.

In some aspects, devices and methods dynamically determine and set a system's parallel and serial processing units (e.g. at the hardware level or also in software), therefore satisfying the aforementioned first and second factors while reaching and retaining the battery state of charge working point. This keeps the current drain as low, but also as close to the optimal working point for constant load conditions while also maintaining the current drain as high as is necessary (and as close to the optimal working point) to account for peak load conditions. The devices and methods herein are able to implement these two conflicting requirements by dynamically setting the system's parallel and serial processing units to battery characteristics, e.g. maintaining a working point around the battery state of charge at the mid-point voltage, independent of processing load conditions, thereby maximizing battery capacity and longevity.

Figure 19:
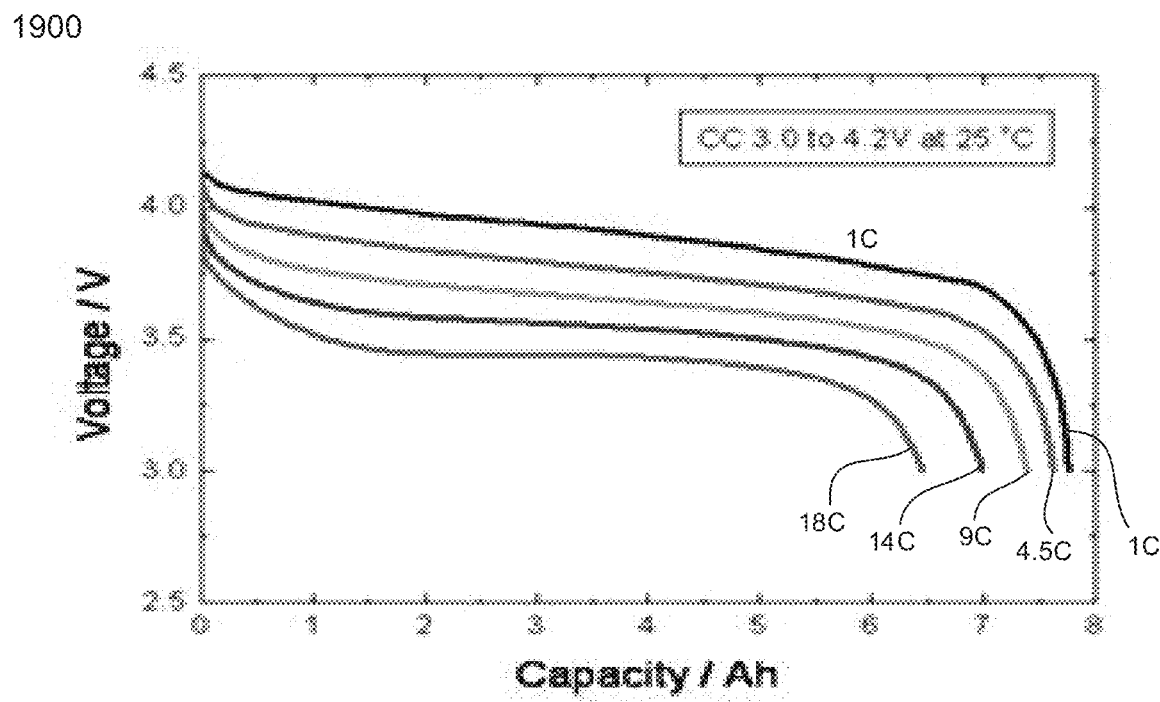
FIGS. 19 and 20 show graphs illustrating parameters for a Battery Discharge Controller (BDC) to account for in some aspects
Figure 20:
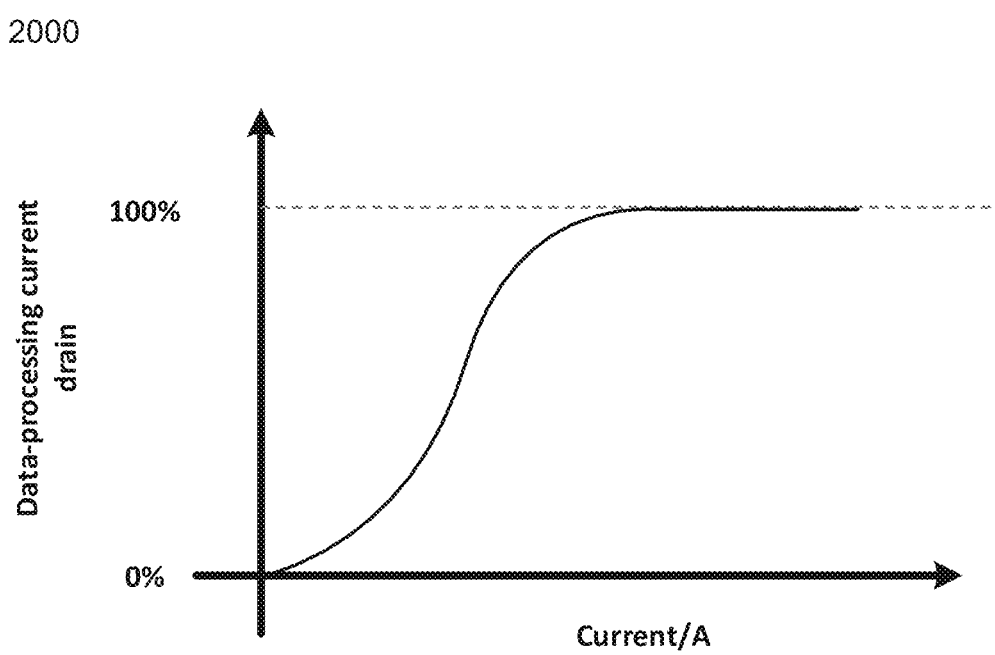

FIGS. 19 and 20 show graphs 1900 and 2000, respectively, illustrating parameters for a Battery Discharge Controller (BDC) to account for according to some aspects. It is appreciated that graphs 1900 and 2000 are exemplary in nature and may thus be simplified for purposes of this disclosure.

Graph 1900 shows a typical dependency between current drain and battery capacity specific to a battery at a fixed voltage level. Different current drains (1 C to 18 C) are shown, where 1 C equals the current for discharging the battery in one hour. As can be seen in graph 1900, at higher current drains (e.g. at 14 C and 18 C), the battery capacity is reduced.

However, batteries of different types may exhibit different characteristics to different load conditions, i.e. different batteries may each have a unique set of curves as shown in graph 1900. Also, thermal characteristics (e.g. ambient temperature) may affect a battery's behavior. Accordingly, each battery type has characteristics which are different to other battery types. The characteristics (i.e. curves shown in graph 1900) specific to a particular battery may be pre-determined (e.g. in lab testing) and implemented/programmed into a Battery Discharge Controller (BDC).

Graph 2000 shows a typical dependency between average data processing versus peak performance current drain in a dedicated time slot. As can be seen in graph 2000, higher data processing is achieved at a higher current drain up to a certain point, in which case the plurality of processing blocks reaches a maximum limit of data processing (e.g. all the processing blocks are running in parallel, or the maximum amount of processing blocks considering thermal considerations is reached).

Taking into account that there is optimal discharge capacity (e.g. 1 C, 1.2 C, i.e. any number greater than 0) for every battery type which maximizes the discharge time of the specific battery, the BDC is configured to identify this discharge current (or discharge current range) and maintain it by configuring the plurality of processing blocks in the appropriate manner (i.e. setting the number of processing blocks operating in parallel and those operating in series so that the identified current is maintained).

Figure 21:
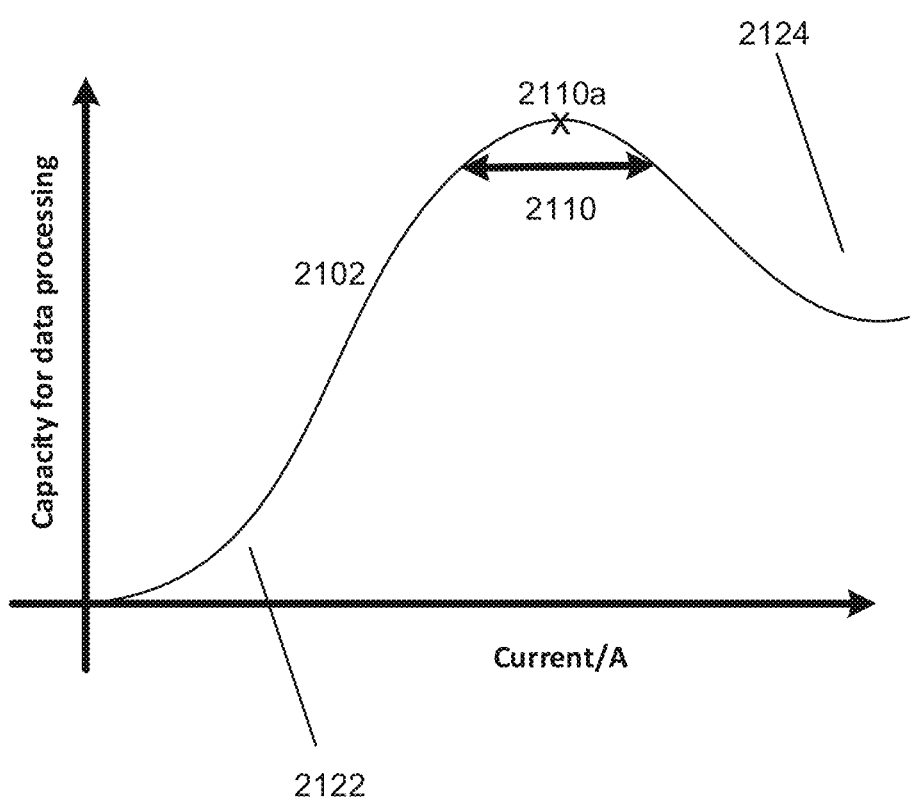
FIG. 21 shows a graph illustrating features that a battery discharge controller (BDC) may implement to determine discharge capacity for a communication device in some aspects.

FIG. 21 shows a graph 2100 illustrating a function that a battery discharge controller (BDC) may implement to determine discharge capacity for a communication device according to some aspects. It is appreciated that graph 2100 is exemplary in nature and may thus be simplified for purposes of this disclosure.

Graph 2100 illustrates an exemplary the dependency of the capacity of data processing (excluding base features, e.g. leakage) on battery discharge current 2102. The x-axis is the battery discharge current and the y-axis is the data processing capacity for a remaining charge of a battery (e.g. could be at full charge, i.e. 100%).

At the lower end, 2122, the dominating effect is that most of the average current drain is used for base features for long periods of time. In this sense, if the battery discharge current is low, the capacity for a plurality of blocks to process data is also low, and the low discharge may only be sufficient to power on the plurality of blocks and not process very much data.

At the upper end, 2124, the dominating effect is that the battery capacity is reduced at high current drain peaks. In this sense, at any given moment, the plurality of processing blocks may be able to process large quantities of data, but due to the high current drain, the battery may discharge at a disadvantageously propionate rate with respect to the data being processed.

Accordingly, the BDC is configured to take into account these factors in order to maintain the system at a working point in range 2110 that is as close to the optimum point 2110a as possible, i.e. results in the most data being processed for a single battery charge. The BDC manages this by controlling the serial and parallel processing split of the processing blocks in the system (e.g. a Network on Chip, NoC). The BDC selects the configuration depending on battery type such that the overall load condition, and therefore the current drain, falls within range 2110, i.e. is as close to 2110a as possible. For example, depending on the granularity of the processing blocks, BDC may not be able to select a current that is exactly at 2210a, but may be able to select a configuration within range 2110.

Among the configurations determined by the BDC to be available (e.g. taking different protocols in to account), the configuration of parallel and serial processing blocks exhibiting the tendencies closest to 2110a is selected. This dynamic tailoring of the parallel and serial processing block configuration maximizes battery discharge time, thereby improving user experience by increasing the availability that a terminal device (such as 102) may be used prior to being charged again. For example, the BDC is configured to determine when the capacity of a configuration lies to the left of range 2110, it increases the number of parallel processing blocks in order to move the system into range 2110, and vice versa, the BDC is configured to determine when the capacity of a configuration lies to the right of range 2110, it increases the number of serial processing blocks in order to move the system into range 2110.

In wireless communication devices, base features always use current while active (i.e. powered on), and during signal processing, for example, fast signal processing is desired in order to shorten the length of operation duration, i.e. high loads for short periods. This is desired so as not to waste power on the base features while the component is powered on. If there is no processing to be done by a component of a device, that component may be turned off in order to eliminate the base feature power consumption, e.g. in the case where a UE is not connected to an WiFi network, the WiFi signal processing circuitry may be switched off, or during a discontinuous reception (DRX) cycle in LTE communications, the reception signal processing circuitry may be powered off, etc.

Accordingly, the BDC is configured to take these factors into account in order to minimize current drain peaks in order to maximize battery life, and also provide sufficient power for signal processing by setting the parallel/serial processing block configuration on a NoC.

Figure 22:
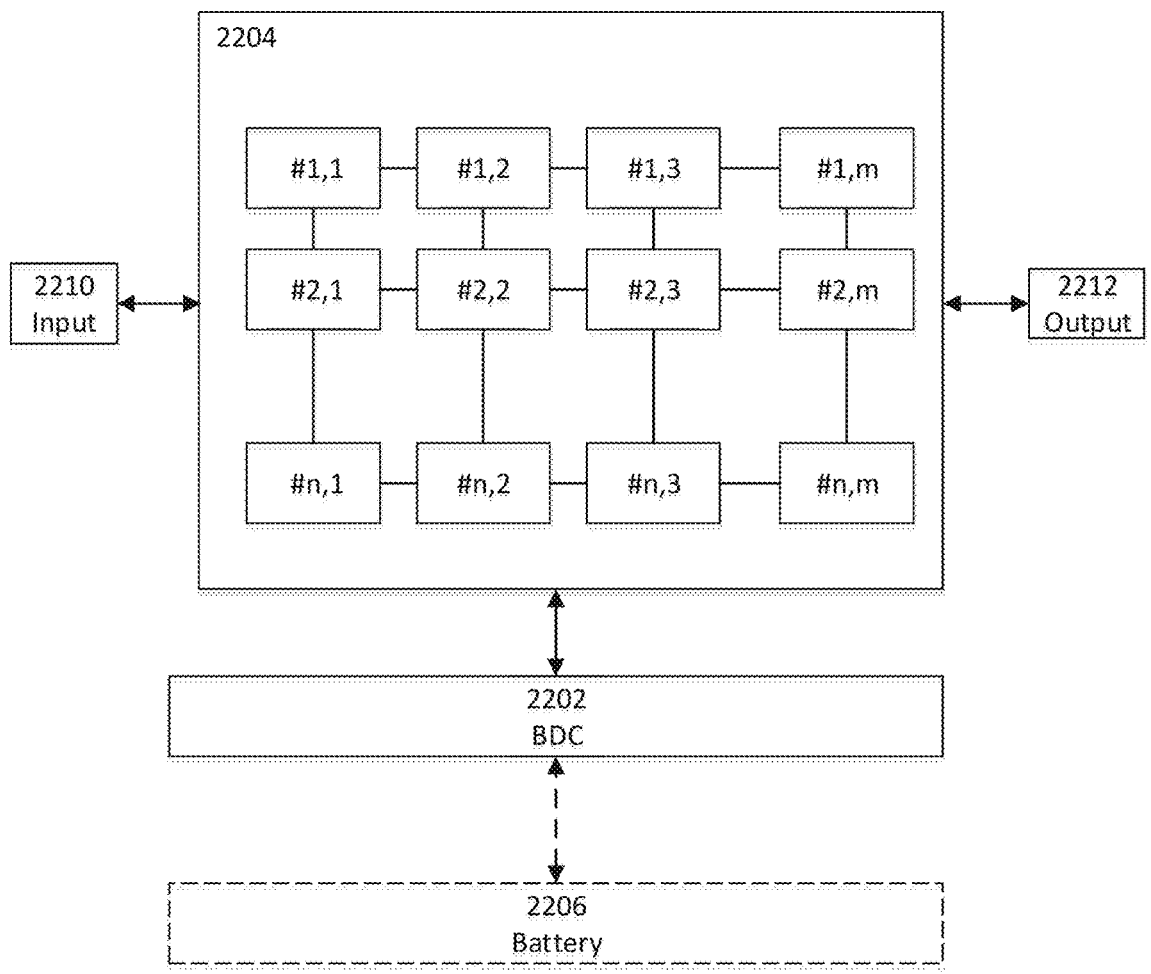
FIG. 22 shows a schematic diagram of a Network on Chip (NoC) with a Battery Discharge Controller (BDC) according to some aspects.

FIG. 22 shows a schematic diagram of a Network on Chip (NoC) 2204 with a Battery Discharge Controller (BDC) 2202 according to some aspects. It is appreciated that schematic diagram 2200 is exemplary in nature and may thus be simplified for purposes of this disclosure.

While BDC 2202 is shown as being external to NoC 2204, it is appreciated that they be integrated so that BDC 2202 and NoC 2204 are included into a single component (e.g. digital signal processor, application processor, etc.) of a communication device (e.g. terminal device 102). NoC is configured with a plurality of processing blocks in rows and columns (each of boxes #1,1 to #n, m; where n and m are any integers greater than 2 and 3, respectively) which may be operatively connected between an one or more inputs and one or more outputs 2212 (only one of each shown in FIG. 23). The BDC 2202 may be implemented as software, hardware, or any combination thereof. BDC 2202 may also include an optional communication channel with a battery 2206 of a terminal device in which it is implemented. In this manner, BDC 2202 may be configured to receive information directly from battery 2206. Alternatively, BDC 2202 may receive information from the battery through input 2210 and NoC 2204. In either case, BDC 2202 is configured to identify the battery and use the appropriate configuration in order to maximize system performance. This may be implemented using a Look up Table (LuT) programmed into a memory accessible by BDC 2302.

As shown in FIG. 22, each of the processing blocks may be arranged to process data/signals either serially or in parallel. The specific configuration (i.e. which blocks operate in serial vs parallel) is set by the BDC 2202.

Figure 23:
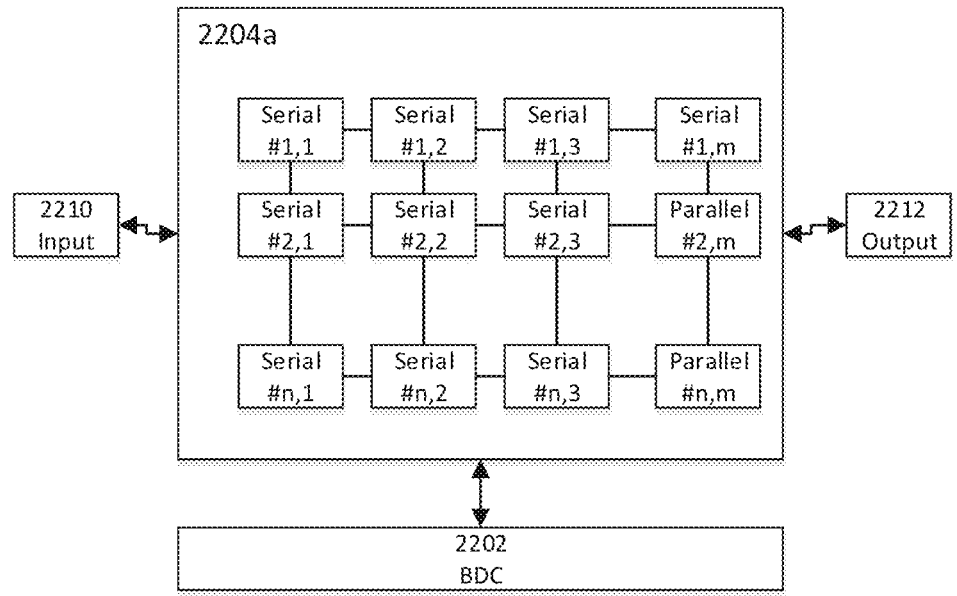
FIGS. 23 and 24 show two exemplary configurations of a plurality of processing cores according to some aspects.
Figure 24:
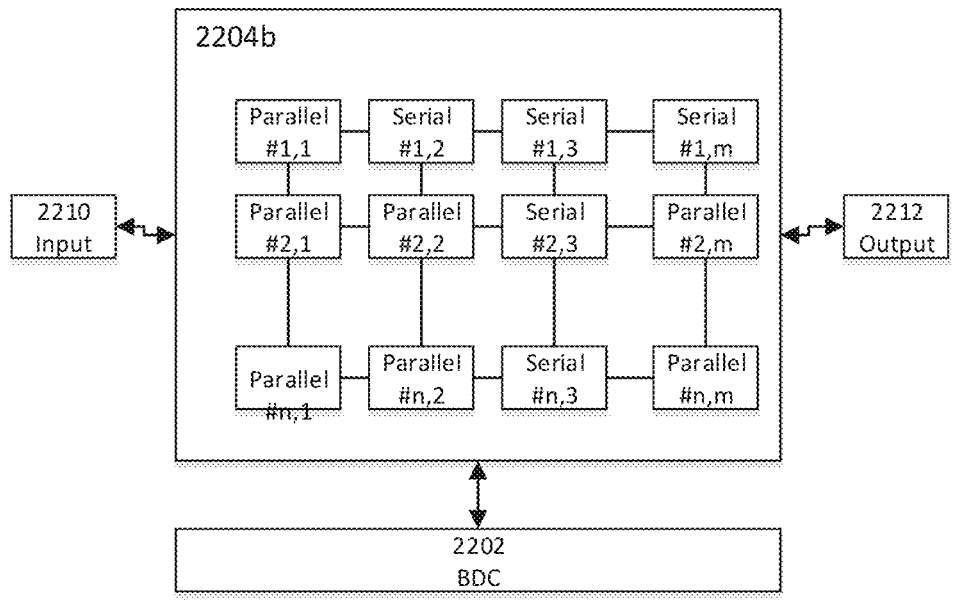

Two exemplary configurations 2204a and 2204b of a plurality of processing blocks are shown in FIGS. 23 and 24, respectively. As demonstrated, 2204a may be implemented by BDC 2202 for systems operating with basic load conditions and 2204b may be implemented by BDC 2202 for systems operating for peak load conditions. For basic load conditions, a higher number of processing blocks will be configured to operate serially as opposed to operating in parallel to ensure that a more constant current drain is maintained (i.e. using graph 2100, to ensure that the device is within 2110 by moving along curve to the right). For peak load conditions, a higher number of processing blocks will be configured to operate in parallel as opposed to operating serially to ensure that a more constant current drain is maintained by minimizing peak capacity drainage time (i.e. using graph 2100, to ensure that the device is within 2110 by moving along curve to the left).

In some aspects, a BDC control loop is implemented to constantly monitor and/or analyze the current drain and allows for the BDC to adapt the parallel/serial execution as required in order to maintain the device in the best operating mode.

In some aspects, BDC 2202 may be configured to operate in different modes.

In a first mode, herein referred to as "static mode," the BDC 2202 is configured at manufacture and determined by a developer to be specific to a system, e.g. a NoC, and a battery type of a communication device in which it is implemented. In this mode, once the BDC is programmed with the appropriate information, e.g. battery type and/or system type (e.g. a modem for a wireless protocol, e.g. LTE), it may set the processing blocks to operate in a configuration (including parallel and serially operating blocks) to maintain the device in a specifically defined working range for improving battery discharge and system performance. The BDC may determine which blocks are to operate either in parallel or serially at a given time according to a wireless protocol, i.e. for which time slots to activate one or more processing blocks in order to process received signals. Furthermore, the BDC 2202 may determine which blocks to (digitally) switch off during given time slots to avoid discharge through base features (e.g. leakage). Accordingly, in static mode, once the BDC 2202 configures the configuration (e.g. on a NoC), the configuration is set.

For static mode, BDC 2202 may be implemented by using a Look up Table (LuT) programmed into a memory component accessible to the BDC 2202 (may be internal or external) by the manufacturer/developer. Such information may include battery type and for what the system is to be used for, e.g. application processing, radio frequency (RF) signal processing, etc.

In a second mode, herein referred to as "dynamic mode," the BDC 2202 is configured to dynamically alter the configuration of serial and parallel processing blocks. In this sense, the BDC 2202 is configured to dynamically maintain the system as close to the optimal working point as possible. The BDC 2202 may monitor the NoC, and adjust the configuration of processing blocks (serial and parallel executing blocks) based on the results of the monitoring. This monitoring may be performed for time periods which are determined to provide a reliable assessment to the BDC 2202. The BDC 2202 may then adjust the configuration of processing of the processing blocks during system downtime, e.g. during idle periods in a discontinuous reception cycle (DRX), during RRC idle mode, during device sleep mode, etc.

In some aspects, the BDC 2202 may be configured to digitally turn off or on processing blocks in order to maintain as constant a current drain as possible.

In some aspects, the BDOC 2202 may be configured to use a pre-determined set of parameters describing the relationship between total data processing capacity of a remaining charge of a battery and a current discharge rate of the battery provided by, for example, a manufacturer or developer, in order to set a configuration of a plurality of processing blocks.

In some aspects, the BDOC 2202 may be further configured to reconfigure the configuration of the plurality of processing blocks based on an information obtained during a monitoring of at least one of a battery or the plurality of processing blocks.

In some aspects, the BDOC 2202 may be configured to reconfigure the configuration of processing blocks during a pre-determined time, e.g. during idle times in discontinuous reception and/or transmission cycles, while in RRC Idle mode, during night time hours, while the battery is charging, or the like.

In an exemplary static mode implementation, the BDOC 2202 may configure five FFTs to operate in parallel in one or more time slots (e.g. according to LTE downlink protocol) in order to achieve a current (battery discharge) to maintain the operating capacity in 2110 as shown in FIG. 21.

Figure 25:
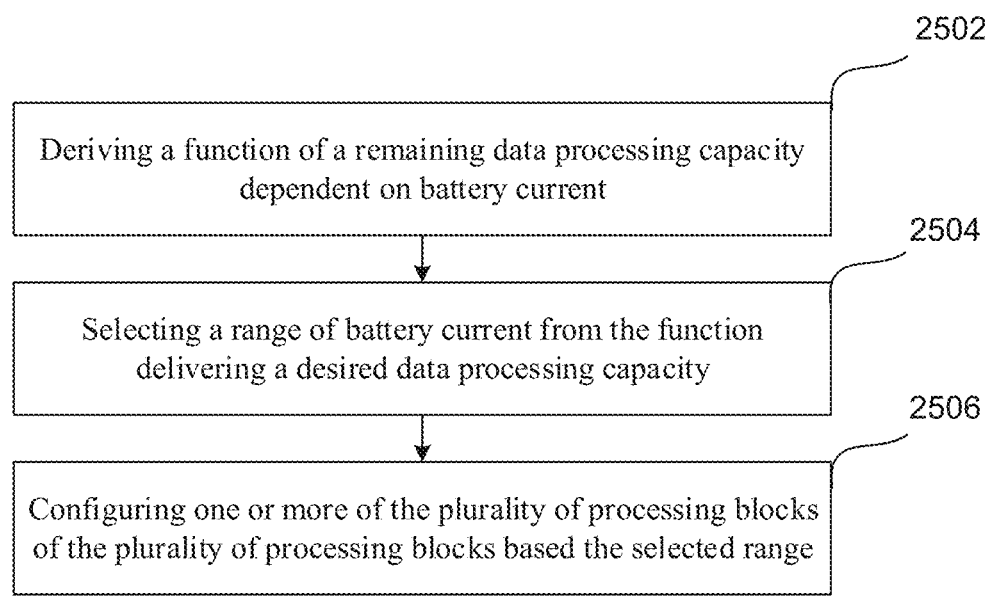
FIG. 25 shows a flowchart for a method for battery discharge control according to some aspects.

FIG. 25 shows a flowchart 2500 describing a method for battery discharge control according to some aspects. Flowchart 2500 describes the method for operating a BDC in static mode.

In 2502, a function is derived which describes a remaining data processing capacity dependent on battery current. This may be a remaining data processing capacity of a battery with a full charge. In some aspects, this function may be provided to a battery discharge controller of a communication device by a manufacturer specific to the battery type and the function of the plurality of processing blocks (e.g. if used for signal processing, or other functions of terminal device 102). An exemplary function is shown in FIG. 21.

In 2504, a range of battery current from the function is selected to deliver a desired data processing capacity. For example, this range may be 2110 of FIG. 21, and even more specifically, it may be 2110a.

In 2506, the BDC configures the one or more of the plurality of processing blocks of the plurality of processing blocks based the selected range.

Figure 26:
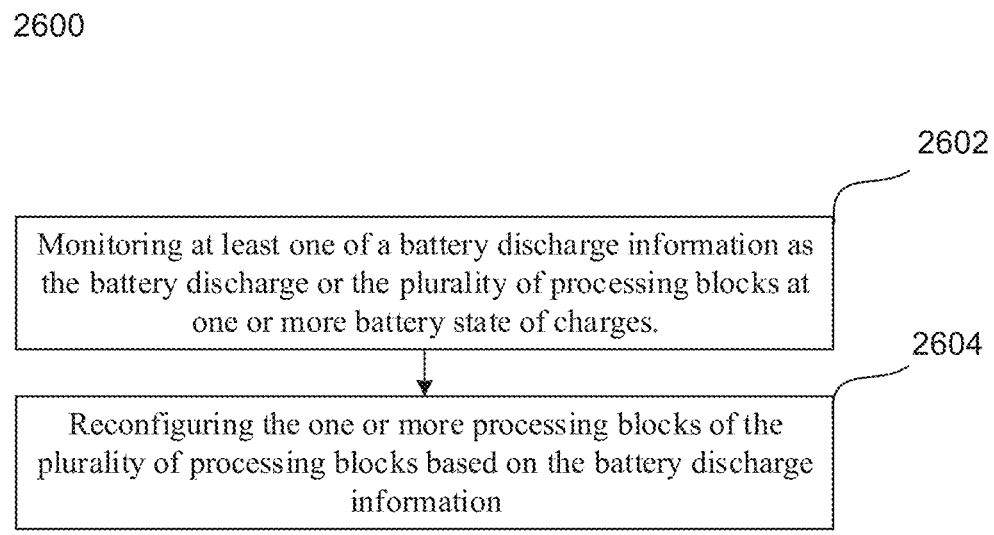
FIG. 26 shows a supplementary flowchart for a method for battery discharge control according to some aspects.

FIG. 26 shows a flowchart 2600 describing a method for battery discharge control according to some aspects. The method described in flowchart 2600 is supplemental to flowchart 2500, and further describes a method for operating a BDC in dynamic mode.

In 2602, at least one of a battery discharge information as the battery discharge or the plurality of processing blocks at one or more battery state of charges is monitored by the BDC.

In 2604, the BDC reconfigures the one or more processing blocks of the plurality of processing blocks based on the monitoring of the battery discharge information or the plurality of processing blocks at one or more battery state of charges. For exemplary purposes, this may include reconfiguring the operation of processing blocks between operating serially or in parallel in order to maintain a battery discharge current in 2110 of FIG. 21.

Figure 27:
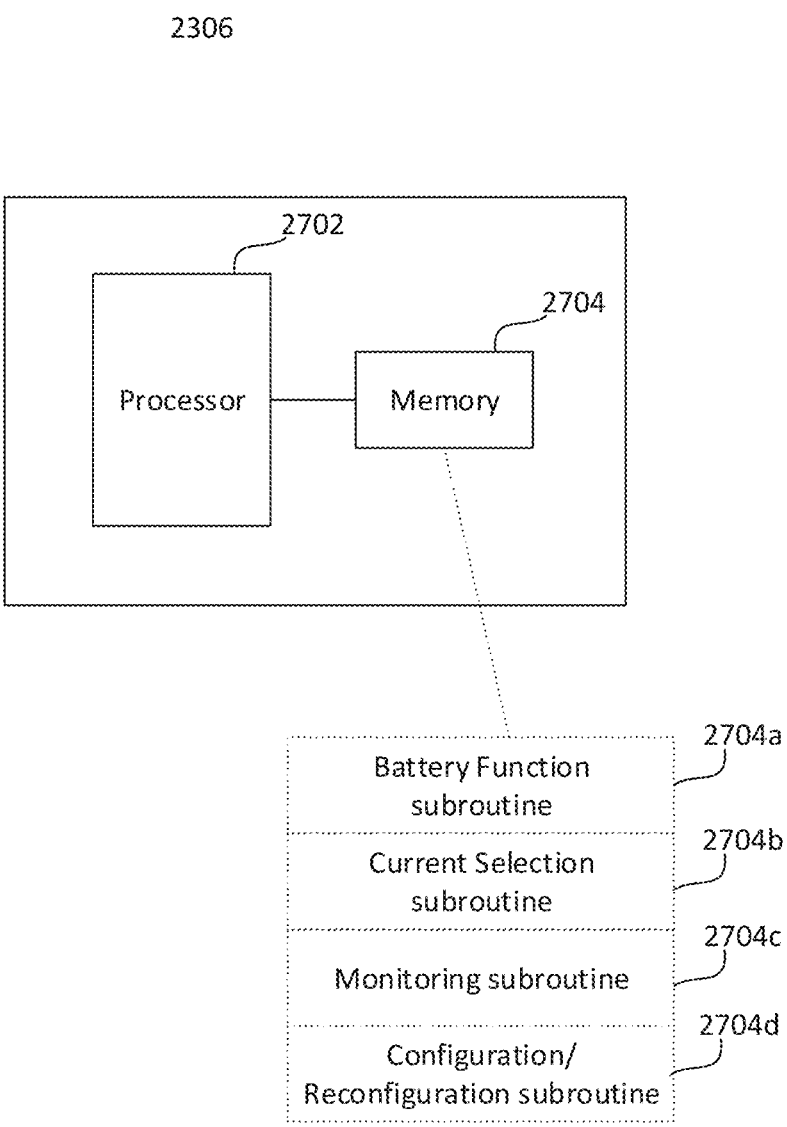
FIG. 27 shows a schematic diagram of an internal configuration of controller according to some aspects.

FIG. 27 shows another schematic diagram of an internal configuration of BDC 2202 according to some aspects. As shown in FIG. 27, BDC 2202 may include processor 2702 and memory 2704. Processor 2702 may be a single processor or multiple processors, and may be configured to retrieve and execute program code to perform the transmission and reception, channel resource allocation, and cluster management as described herein. Processor 2702 may transmit and receive data over a software-level connection that is physically transmitted as wireless signals or over physical connections. Memory 2704 may be a non-transitory computer readable medium storing instructions for one or more of Battery Function subroutine 2704a, a Current Selection subroutine 2704b, a Monitoring subroutine 2704c, and/or Configuration/Reconfiguration subroutine 2704d.

PPPM subroutine 2704a, an HWPM subroutine 2704b, a Modem Pmax Estimator subroutine 2704c, and/or a thermal manager subroutine 2704d may each be an instruction set including executable instructions that, when retrieved and executed by processor 2702, perform the functionality of BDC 2202 as described herein. In particular, processor 2702 execute Battery Function subroutine 2704b to derive a function of a remaining data processing capacity dependent on battery current (e.g. may be stored as a LUT); processor 2702 may execute Current Selection subroutine 2704b to select a range of battery current from the function delivering a desired data processing capacity (e.g. within an range as shown in FIG. 22); processor 2702 may execute Monitoring subroutine 2704c to implement aspects dynamic mode of a BDC as described herein; and/or processor 2702 may execute Configuration/Reconfiguration subroutine 2704d to configure and/or reconfigure a plurality of processing blocks. While shown separately within memory 2704, it is appreciated that subroutines 2704a-2704d may be combined into a single subroutine exhibiting similar total functionality.

The following examples pertain to further aspects of this disclosure:

Example 1 is a communication device for allocating power among a plurality of circuits, the communication device including one or more processors configured to determine a power budget for allocating to the plurality of circuits based on a power supply information; receive an activity status from a first circuit of the plurality of circuits; determine a first power value based on the activity status; derive a second power value based on the first power value and the power budget; and allocate power based on the second power value to a second circuit of the plurality of circuits.

In Example 2, the subject matter of Example(s) 1 may include the one or more processor configured to obtain the power supply information from a battery of the communication device.

In Example 3, the subject matter of Example(s) 1-2 may include wherein the power supply information comprises a state of charge of a battery of the communication device.

In Example 4, the subject matter of Example(s) 1-3 may include, wherein the first circuit is a cellular modem.

In Example 5, the subject matter of Example(s) 4 may include wherein the cellular modem is configured to operate according on one or more radio access technologies (RATs).

In Example 6, the subject matter of Example(s) 5 may include wherein at least one of the RATs is configured to operate according to a Radio Resource Control (RRC) protocol.

In Example 7, the subject matter of Example(s) 6 may include the one or more processor configured to determine the activity status based on the cellular modem's RRC state.

In Example 8, the subject matter of Example(s) 7 may include the one or more processor configured to determine whether the RRC state is idle mode or in connected mode.

In Example 9, the subject matter of Example(s) 8 may include the one or more processor configured to determine the first power value based on the determination of the RRC state being in idle mode or connected mode.

In Example 10, the subject matter of Example(s) 5-9 may include the one or more processor configured to determine a number of carriers being used by the cellular modem.

In Example 11, the subject matter of Example(s) 10 may include the one or more processor configured to determine the first power value based on the number of carriers.

In Example 12, the subject matter of Example(s) 5-11 may include the one or more processor configured to observe radio channel conditions.

In Example 13, the subject matter of Example(s) 21 may include the one or more processor configured to determine a location based on a received signal from a base station.

In Example 14, the subject matter of Example(s) 12-13 may include wherein the location is a cell center or a cell edge of a cell on which the communication device is camped on.

In Example 15, the subject matter of Example(s) 4-14 may include, the one or more processor configured to determine the first power value based on a transmit level of the cellular modem.

In Example 16, the subject matter of Example(s) 1-15 may include the one or more processor configured to subtract the first power value from the power budget in order to derive the second power value.

In Example 17, the subject matter of Example(s) 1-16 may include the one or more processor configured to receive an updated activity status from the first circuit.

In Example 18, the subject matter of Example(s) 17 may include, the one or more processor configured to determine an updated first power value based on the updated activity status.

In Example 19, the subject matter of Example(s) 18 may include the one or more processor configured to derive an updated second power value based on the updated first value and the power budget.

In Example 20, the subject matter of Example(s) 19 may include the one or more processor configured to reallocate power to the one or more remaining circuits based on the updated second power value.

In Example 21, the subject matter of Example(s) 4-20 may include the one or more processor configured to determine a cellular modem power envelope.

In Example 22, the subject matter of Example(s) 21 may include the one or more processor configured to select cellular modem power consumption parameters from one or more cellular modem internal state variables.

In Example 23, the subject matter of Example(s) 22 may include wherein the one or more cellular modem internal state variables is at least one of a RAT, RRC state, number of downlink and/or uplink component carriers, or a transmit power level.

In Example 24, the subject matter of Example(s) 21-23 may include the one or more processor configured to add parameters to cover cellular modem power variations due to secondary parameters.

In Example 25, the subject matter of Example(s) 24 may include wherein one or more of the secondary parameters is a downlink throughout, an uplink throughput, an impedance in antenna mismatch, or one or more thermal parameters.

In Example 26, the subject matter of Example(s) 4-25 may include the one or more processor configured to identify one or more trigger events in order to determine the activity status.

In Example 27, the subject matter of Example(s) 26 may include wherein the one or more trigger events is at least one of a measurement for cell re-selection in RRC idle mode, a tracking area update (TAU), or a transmit power control during active connection.

In Example 28, the subject matter of Example(s) 4-27 may include the one or more processor configured to receive a modem throttling state in order to determine the activity status.

In Example 29, the subject matter of Example(s) 28 may include the one or more processor configured to classify the throttling state as one of a plurality of levels.

In Example 30, the subject matter of Example(s) 29 may include wherein the plurality of classes comprise a zero throttling level, a first throttling activity level, a second throttling activity level, and a third throttling level.

In Example 31, the subject matter of Example(s) 28-30 may include the one or more processor configured to determine the activity status of the cellular modem based on the modem throttling state.

In Example 32, the subject matter of Example(s) 1-31 may include the one or more processor configured to determine an amount of time that the first circuit will remain in the activity status.

In Example 33, the subject matter of Example(s) 1-32 may include wherein one of the one or more remaining circuits of the plurality of circuits is an application processor.

In Example 34, the subject matter of Example(s) 1-33 may include the one or more processor configured to retrieve the first power value and/or the updated first power value from a look up table (LuT) stored in a memory.

In Example 35, the subject matter of Example(s) 34 may include the one or more processor configured to update the LuT as a result of a received software update.

In Example 36, the subject matter of Example(s) 1-35 may include the one or more processors configured to use machine learning to determine the first power value.

In Example 37, the subject matter of Example(s) 36 may include wherein the machine learning uses cellular modem internal state variables to determine the first power value.

In Example 38, the subject matter of Example(s) 22-37 may include wherein the cellular internal state variables includes one or more of a connected Radio Access Technology (RAT); Radio Resource Control (RRC) state; number of component carriers (CCs); transmit (Tx) power levels; Application Processor or Packet Data Convergence Protocol (PDCP) indications for uplink data to be transmitted along with its buffer size; indications at Radio Link Control (RLC) or Media Access Control (MAC) level including scheduling requests, or buffer status reports; a number of downlink and/or uplink CCs; dynamic activation/de-activation of the CCs by a network; a Modulation Coding Scheme (MCS); frequency band information; or connected discontinuous reception cycle (C-DRX) state entry and/or exit indications from the communication device.

In Example 39, a method for allocating power among a plurality of circuits in a communication device, the method including determining a power budget for allocating to the plurality of circuits from a power supply information; receiving an activity status from a first circuit of the plurality of circuits; determining a first power value based on the activity status; deriving a second power value based on the first power value and the power budget; and allocating power to one or more remaining circuits of the plurality of circuits based on the second power value.

In Example 40, the subject matter of Example(s) 39 may include obtaining the power supply information from a battery of the communication device.

In Example 41, the subject matter of Example(s) 39-40 may include, wherein the power supply information comprises a state of charge of a battery of the communication device.

In Example 42, the subject matter of Example(s) 39-41 may include wherein the first circuit is a cellular modem of the communication device.

In Example 43, the subject matter of Example(s) 42 may include wherein the cellular modem is configured to operate according on one or more radio access technologies (RATs).

In Example 44, the subject matter of Example(s) 43 may include wherein at least one of the RATs is configured to operate according to a Radio Resource Control (RRC) protocol.

In Example 45, the subject matter of Example(s) 44 may include determining the activity status based on the cellular modem's RRC state.

In Example 46, the subject matter of Example(s) 45 may include determining whether the RRC state is idle mode or in connected mode.

In Example 47, the subject matter of Example(s) 46 may include determining the first power value based on the determination of the RRC state being in idle mode or connected mode.

In Example 48, the subject matter of Example(s) 43-47 may include determining a number of carriers being used by the cellular modem.

In Example 49, the subject matter of Example(s) 48 may include determining the first power value based on the number of carriers.

In Example 50, the subject matter of Example(s) 43-49 may include determining radio channel conditions of the communication device.

In Example 51, the subject matter of Example(s) 50 may include determining the location based on a received signal from a base station.

In Example 52, the subject matter of Example(s) 50-51 may include wherein the location is a cell center or a cell edge of a cell on which the communication device is camped on.

In Example 53, the subject matter of Example(s) 42-52 may include determining the first power value based on a transmit level of the cellular modem.

In Example 54, the subject matter of Example(s) 39-53 may include subtracting the first power value from the power budget in order to derive the second power value.

In Example 55, the subject matter of Example(s) 39-54 may include receiving an updated activity status from the first circuit.

In Example 56, the subject matter of Example(s) 55 may include determining an updated first power value based on the updated activity status.

In Example 57, the subject matter of Example(s) 56 may include deriving an updated second power value based on the updated first value and the power budget.

In Example 58, the subject matter of Example(s) 57 may include reallocating power to the one or more remaining circuits based on the updated second power value.

In Example 59, the subject matter of Example(s) 42-58 may include determining a cellular modem power envelope.

In Example 60, the subject matter of Example(s) 59 may include selecting cellular modem power consumption parameters from one or more cellular modem internal state variables.

In Example 61, the subject matter of Example(s) 60 may include wherein the one or more cellular modem internal state variables is at least one of a RAT, RRC state, number of downlink component carriers, or a transmit power level.

In Example 62, the subject matter of Example(s) 59-61 may include adding parameters to cover cellular modem power variations due to secondary parameters.

In Example 63, the subject matter of Example(s) 62 may include wherein one or more of the secondary parameters is a downlink throughout, an uplink throughput, an impedance in antenna mismatch, or one or more thermal parameters.

In Example 64, the subject matter of Example(s) 42-63 may include identifying one or more trigger events in order to determine the activity status.

In Example 65, the subject matter of Example(s) 64 may include wherein the one or more trigger events is at least one of a measurement for cell re-selection in RRC idle mode, a tracking area update (TAU), or a transmit power control during active connection.

In Example 66, the subject matter of Example(s) 42-65 may include receiving a modem throttling state in order to determine the activity status.

In Example 67, the subject matter of Example(s) 66 may include classifying the throttling state as one of a plurality of levels.

In Example 68, the subject matter of Example(s) 67 may include wherein the plurality of classes comprise a zero throttling level, a first throttling activity level, a second throttling activity level, and a third throttling level.

In Example 69, the subject matter of Example(s) 66-68 may include determining the activity status of the cellular modem based on the modem throttling state.

In Example 70, the subject matter of Example(s) 39-69 may include a predetermined amount of time that the first circuit will remain in the activity status.

In Example 71, the subject matter of Example(s) 39-70 may include wherein one of the one or more remaining circuits of the plurality of circuits is an application processor.

In Example 72, the subject matter of Example(s) 39-71 may include retrieving the first power value and/or the updated first power value from a look up table (LuT).

In Example 73, the subject matter of Example(s) 39-72 may include updating the LuT as a result of a received software update for the communication device.

In Example 74, the subject matter of Example(s) 39-73 may include using machine learning to determine the first power value.

In Example 75, the subject matter of Example(s) 74 may include wherein the machine learning uses cellular modem internal state variables to determine the first power value.

In Example 76, the subject matter of Example(s) 75 may include, wherein the cellular internal state variables includes one or more of a connected Radio Access Technology (RAT); Radio Resource Control (RRC) state; number of component carriers (CCs); transmit (Tx) power levels; Application Processor or Packet Data Convergence Protocol (PDCP) indications for uplink data to be transmitted along with its buffer size; indications at Radio Link Control (RLC) or Media Access Control (MAC) level including scheduling requests, or buffer status reports; a number of downlink and/or uplink CCs; dynamic activation/de-activation of the CCs by a network; a Modulation Coding Scheme (MCS); frequency band information; or connected discontinuous reception cycle (C-DRX) state entry and/or exit indications from the communication device.

In Example 77, a method for configuring a plurality of processing blocks on a chip specific to a battery providing power to the chip, the method including deriving a function of a remaining data processing capacity dependent on battery current; selecting a range of battery current from the function delivering a desired data processing capacity; and configuring one or more of the plurality of processing blocks of the plurality of processing blocks based the selected range.

In Example 78, the subject matter of Example(s) 77 may include determining a local maximum of the function.

In Example 79, the subject matter of Example(s) 78 may include selecting the range based on the local maximum.

In Example 80, the subject matter of Example(s) 77-79 may include wherein the range depends on a processing granularity of the plurality of processing blocks.

In Example 81, the subject matter of Example(s) 77-80 may include wherein deriving the function comprises testing the battery at a plurality of battery operating loads to obtain the function.

In Example 82, the subject matter of Example(s) 77-81 may include storing the function. This may include storing the function or values associated with the function in a Look Up table (LUT).

In Example 83, the subject matter of Example(s) 77-82 may include monitoring a battery information as the battery discharges.

In Example 84, the subject matter of Example(s) 83 may include, wherein the battery information comprises at least one of a battery current or a battery state of charge.

In Example 85, the subject matter of Example(s) 83-84 may include monitoring the plurality of processing blocks at one or more battery state of charges.

In Example 86, the subject matter of Example(s) 83-85 may include further comprising monitoring the plurality of processing blocks at one or more battery currents.

In Example 87, the subject matter of Example(s) 83-86 may include reconfiguring the one or more processing blocks of the plurality of processing blocks based on a battery state of charge.

In Example 88, the subject matter of Example(s) 83-87 may include reconfiguring the one or more processing blocks of the plurality of processing blocks based on a battery current.

In Example 89, the subject matter of Example(s) 77-88 may include determining a base operational current for maintaining one or more processing blocks of the plurality of processing blocks powered on.

In Example 90, the subject matter of Example(s) 77-89 may include determining a minimum operational current for processing a selected data at one or more processing blocks of the plurality of processing blocks.

In Example 91, the subject matter of Example(s) 90 may include wherein the selected data includes data received by wireless communications.

In Example 92, the subject matter of Example(s) 91 may include wherein the data is received according to one or more wireless protocols.

In Example 93, the subject matter of Example(s) 77-92 may include wherein the selected data includes application data for one or more applications.

In Example 94, the subject matter of Example(s) 77-93 may include switching at least one of the plurality of processing blocks on or off based on the configuration.

In Example 95, a communication device with a battery discharge controller for controlling a plurality of processing blocks on a chip specific to a battery providing power to the chip, the battery discharge controller configured to derive a function of a remaining data processing capacity dependent on battery current; select a range of battery current from the function delivering a desired data processing capacity; and configure one or more of a plurality of processing blocks of the plurality of processing blocks based the selected range.

In Example 96, the subject matter of Example(s) 95 may include the battery discharge controller configured to determine a local maximum of the function.

In Example 97, the subject matter of Example(s) 96 may include the battery discharge controller configured to select the range based on the local maximum.

In Example 98, the subject matter of Example(s) 95-97 may include wherein the range depends on a processing granularity of the plurality of processing blocks.

In Example 99, the subject matter of Example(s) 95-98 may include wherein deriving the function comprises testing the battery at a plurality of battery operating loads to obtain the function.

In Example 100, the subject matter of Example(s) 95-99 may include the battery discharge controller operatively coupled to a memory, wherein the memory is configured to store the function in a Look Up table (LUT).

In Example 101, the subject matter of Example(s) 95-100 may include the battery discharge controller configured to monitor a battery information as the battery discharges.

In Example 102, the subject matter of Example(s) 101 may include wherein the battery information comprises at least one of a battery current or a battery state of charge.

In Example 103, the subject matter of Example(s) 101-102 may include the battery discharge controller configured to monitor the plurality of processing blocks at one or more battery state of charges.

In Example 104, the subject matter of Example(s) 101-103 may include the battery discharge controller configured to monitor the plurality of processing blocks at one or more battery currents.

In Example 105, the subject matter of Example(s) 101-104 may include the battery discharge controller configured to reconfigure the one or more processing blocks of the plurality of processing blocks based on a battery state of charge.

In Example 106, the subject matter of Example(s) 101-105 may include the battery discharge controller configured to reconfigure the one or more processing blocks of the plurality of processing blocks based on a battery current.

In Example 107, the subject matter of Example(s) 95-106 may include the battery discharge controller configured to determine a base operational current for maintaining one or more processing blocks of the plurality of processing blocks powered on.

In Example 108, the subject matter of Example(s) 95-107 may include the battery discharge controller configured to determine a minimum operational current for processing a selected data at one or more processing blocks of the plurality of processing blocks.

In Example 109, the subject matter of Example(s) 108 may include wherein the selected data includes data received by wireless communications.

In Example 110, the subject matter of Example(s) 109 may include wherein the data is received according to one or more wireless protocols.

In Example 111, the subject matter of Example(s) 95-110 may include wherein the selected data includes application data for one or more applications.

In Example 112, the subject matter of Example(s) 95-111 may include the battery discharge controller configured to switch at least one of the plurality of processing blocks on or off based on the configuration.

In Example 113, one or more non-transitory computer readable media including program instructions, which when executed by one or more processors perform a method or realize a device as claimed in any preceding claim.

In some aspects, the power budget determined from the power supply information may be allocated according to different priorities to the plurality of circuits (e.g. LTE cellular modem or other RAT cellular modem; Application Processor (i.e. SoC); WiFi, Near Field Communication (NFC) or Bluetooth transceiver(s); display; speakers, etc.). For example, a first power value associated with an LTE cellular modem may be accorded a higher priority than a second power value associated with an Application Processor, and accordingly, the second power value may be determined from the power budget after the first power value is determined for allocation to the LTE cellular modem. Similarly, this method of prioritization of resources from the power budget may be applied to other UE components, e.g. first prioritize assigning the required power to the speaker(s) of the UE, and then adjust the power to the UE display if playing audio files, for example. In this manner, UE components with lower priority are assigned power from the power budget after determining the power to assign to higher priority components, depending on the use case.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes, which come within the meaning and range of equivalency of the claims, are therefore intended to be embraced.

What is claimed is:

1. A communication device for wireless communications, the communication device comprising at least one processor configured to:
    determine a power budget for allocating to a plurality of circuits based on a power supply information;
    receive, from a first circuit of the plurality of circuits, an indication of a thermal budget of the first circuit, an activity status of the first circuit, and a throttling state of the first circuit, wherein the indication of the thermal budget includes at least one of a time period during which a thermal capacity of the first circuit is limited, a duration of time during which a power budget will be needed by the first circuit, or timing of a next power budget update from the first circuit, wherein the throttling state is classified as one of a plurality of levels, wherein each level is associated with a released portion of a power budget for a circuit, wherein a first level is associated with no released portion of the power budget, and wherein a second level is associated with release of all of the power budget;
    determine a first power value based on the activity status and throttling state of the first circuit;
    derive a second power value based on the first power value and the power budget;
    send, to the first circuit, a request that the first circuit enter a throttled state; and
    allocate power based on the second power value to a second circuit of the plurality of circuits.

2. The communication device of claim 1,
the at least one processor configured to obtain the power supply information from a battery of the communication device.

3. The communication device of claim 1,
the at least one processor configured to observe radio channel conditions and use the observed radio channel conditions to determine the first power value.

4. The communication device of claim 1,
the at least one processor configured to subtract the first power value from the power budget in order to derive the second power value.

5. The communication device of claim 1,
the at least one processor configured to select cellular modem power consumption parameters for determining the first power value from one or more cellular modem internal state variables including one or more of: a connected Radio Access Technology (RAT); Radio Resource Control (RRC) state; number of component carriers (CCs); transmit (Tx) power levels; Application Processor or Packet Data Convergence Protocol (PDCP) indications for uplink data to be transmitted along with its buffer size; indications at Radio Link Control (RLC) or Media Access Control (MAC) level including scheduling requests or buffer status reports; a number of downlink and/or uplink CCs; dynamic activation/de-activation of the CCs by a network; a Modulation Coding Scheme (MCS); frequency band information; or connected discontinuous reception cycle (C-DRX) state entry or exit indications from the communication device.

6. The communication device of claim 1,
the at least one processor configured to receive an updated activity status from the first circuit.

7. The communication device of claim 6,
the at least one processor configured to determine an updated first power value based on the updated activity status.

8. The communication device of claim 7,
the at least one processor configured to derive an updated second power value based on the updated first value and the power budget.

9. The communication device of claim 8,
the at least one processor configured to reallocate power to one or more remaining circuits based on the updated second power value.

10. The communication device of claim 1, wherein the first circuit is a cellular modem.

11. The communication device of claim 10, wherein the cellular modem is configured to operate according on one or more radio access technologies (RATs).

12. The communication device of claim 11, the at least one processor configured to determine the activity status based on the cellular modem's RAT connected state.

13. The communication device of claim 10, the at least one processor configured to determine a number of carriers used by the cellular modem.

14. The communication device of claim 13, the at least one processor configured to determine the first power value based on the number of carriers.

15. A method for allocating power among a plurality of circuits in a communication device, the method comprising:
   determining a power budget for allocating to the plurality of circuits from a power supply information;
   receiving, from a first circuit of the plurality of circuits, an indication of a thermal budget of the first circuit, an activity status of the first circuit, and a throttling state of the first circuit, wherein the indication of the thermal budget includes at least one of a time period during which a thermal capacity of the first circuit is limited, a duration of time during which a power budget will be needed by the first circuit, or timing of a next power budget update from the first circuit, wherein the throttling state is classified as one of a plurality of levels, wherein each level is associated with a released portion of a power budget for a circuit, wherein a first level is associated with no released portion of the power budget, and wherein a second level is associated with release of all of the power budget;
   determining a first power value based on the activity status and throttling state of the first circuit;
   deriving a second power value based on the first power value and the power budget;
   sending, to the first circuit, a request that the first circuit enter a throttled state; and
   allocating power to one or more remaining circuits of the plurality of circuits based on the second power value.

16. The method of claim 15, further comprising:
   obtaining the power supply information from a battery of the communication device.

17. The method of claim 15, wherein the first circuit is a cellular modem, wherein the cellular modem is configured to operate according on one or more radio access technologies (RATs), and wherein the activity status is based on the cellular modem's RAT connected state.

18. One or more non-transitory computer-readable media storing instructions executed by at least one processor of a communication device to direct the at least one processor to perform a method comprising:
   determining a power budget for allocating to a plurality of circuits from a power supply information;
   receiving, from a first circuit of the plurality of circuits, an indication of a thermal budget of the first circuit, an activity status of the first circuit, and a throttling state of the first circuit, wherein the indication of the thermal budget includes at least one of a time period during which a thermal capacity of the first circuit is limited, a duration of time during which a power budget will be needed by the first circuit, or timing of a next power budget update from the first circuit, wherein the throttling state is classified as one of a plurality of levels, wherein each level is associated with a released portion of a power budget for a circuit, wherein a first level is associated with no released portion of the power budget, and wherein a second level is associated with release of all of the power budget;
   determining a first power value based on the activity status and throttling state of the first circuit;
   deriving a second power value based on the first power value and the power budget;
   sending, to the first circuit, a request that the first circuit enter a throttled state; and
   allocating power to one or more remaining circuits of the plurality of circuits based on the second power value.

19. The one or more non-transitory computer-readable media of claim 18,
   further comprising obtaining the power supply information from a battery of the communication device.

20. The one or more non-transitory computer-readable media of claim 18,
   wherein the first circuit is a cellular modem, wherein the cellular modem is configured to operate according on one or more radio access technologies (RATs), and wherein the activity status is based on the cellular modem's RAT connected state.

* * * * *